US012701513B2

(12) United States Patent (10) Patent No.: US 12,701,513 B2
Wang et al. (45) Date of Patent: Aug. 4, 2026

(54) METHOD FOR DETERMINING FEATURE OF TERMINAL AND COMMUNICATION APPARATUS

(71) Applicant: HUAWEI TECHNOLOGIES CO., LTD., Shenzhen (CN)

(72) Inventors: Ting Wang, Shanghai (CN); Yongxia Lyu, Shenzhen (CN); Jun Wang, Shanghai (CN); Jianglei Ma, Ottawa (CA); Liqing Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 398 days.

(21) Appl. No.: 18/343,911

(22) Filed: Jun. 29, 2023

(65) Prior Publication Data

US 2023/0345376 A1 Oct. 26, 2023

Related U.S. Application Data

(63) Continuation of application No. PCT/CN2021/138707, filed on Dec. 16, 2021.

(30) Foreign Application Priority Data

Dec. 31, 2020 (CN) .......................... 202011628056.3

(51) Int. Cl.
*H04W 52/02* (2009.01)
(52) U.S. Cl.
CPC .............................. *H04W 52/0264* (2013.01)
(58) Field of Classification Search
None
See application file for complete search history.

(56) References Cited

U.S. PATENT DOCUMENTS

| | | | | |
|---|---|---|---|---|
| 10,356,608 B2 * | 7/2019 | Au | .......................... | H04W 84/00 |
| 2014/0204847 A1 * | 7/2014 | Belleschi | .............. | H04W 76/14 |
| | | | | 370/329 |
| 2015/0043438 A1 * | 2/2015 | Fwu | .................... | H04L 61/3005 |
| | | | | 370/329 |
| 2015/0245256 A1 * | 8/2015 | Kiss | ...................... | H04W 60/04 |
| | | | | 455/436 |
| 2017/0181154 A1 * | 6/2017 | Zhou | ........................ | H04W 4/70 |
| 2018/0160253 A1 * | 6/2018 | Ahluwalia | ........... | H04B 1/3816 |
| 2018/0279116 A1 | 9/2018 | Van Der Velde | | |

(Continued)

FOREIGN PATENT DOCUMENTS

| | | |
|---|---|---|
| CN | 102238629 A | 11/2011 |
| CN | 105722012 A | 6/2016 |

(Continued)

OTHER PUBLICATIONS

European Search Report for EP Application No. 21913936 dated Apr. 15, 2024, 11 pages.

(Continued)

*Primary Examiner* — Lonnie V Sweet

(57) ABSTRACT

The technology of this application relates to a method for determining a feature of a terminal and a communication apparatus. A mandatory feature set in a feature set of a terminal determined by the terminal or a network device is related to a type of the terminal. In this way, a mandatory feature set may be separately defined for different types of terminals. This customizes features of the terminals, helps minimize the features of the terminals, meets feature requirements of the different types of terminals, reduces chip costs and terminal implementation processing complexity, and implements terminal energy saving.

17 Claims, 5 Drawing Sheets

(56) References Cited

U.S. PATENT DOCUMENTS

| | | | | |
|---|---|---|---|---|
| 2019/0223241 | A1* | 7/2019 | Manolakis | H04W 72/542 |
| 2019/0239064 | A1* | 8/2019 | Stojanovski | H04W 8/26 |
| 2019/0289507 | A1* | 9/2019 | Pudney | H04W 60/00 |
| 2019/0313239 | A1* | 10/2019 | Horn | H04W 8/08 |
| 2020/0145867 | A1* | 5/2020 | Tseng | H04L 1/0026 |
| 2020/0314834 | A1* | 10/2020 | Lei | H04W 72/51 |
| 2020/0366326 | A1* | 11/2020 | Jassal | G06N 3/08 |
| 2022/0007176 | A1* | 1/2022 | Lindheimer | H04L 9/3239 |
| 2022/0124533 | A1* | 4/2022 | Li | H04W 24/10 |
| 2022/0312544 | A1* | 9/2022 | Ljung | H04W 52/0229 |
| 2023/0041665 | A1* | 2/2023 | Han | H04N 21/4516 |
| 2023/0232211 | A1* | 7/2023 | Hong | H04W 8/22 |
| | | | | 455/422.1 |
| 2023/0232213 | A1* | 7/2023 | Hong | H04W 8/24 |
| | | | | 370/329 |

FOREIGN PATENT DOCUMENTS

| | | |
|---|---|---|
| CN | 112153632 A | 12/2020 |
| WO | 2020029362 A1 | 2/2020 |

OTHER PUBLICATIONS

3GPP TR 38.822 V15.0.1 (Jul. 2019), 3rd Generation Partnership Project; Technical Specification Group Radio Access Network; NR; User Equipment (UE) feature list (Release 15), total 64 pages.

Moderators (ATandT, NTT Docomo, Inc.), Updated RAN1 Ue features list for Rel-16 NR including remaining RAN1 issues, R1-2007326, Aug. 17-28, 2020, total 87 pages.

3GPP TS 38.101-1 V15.0.0 (Dec. 2017), 3rd Generation Partnership Project; Technical Specification Group Radio Access Network; NR; User Equipment (UE) radio transmission and reception; Part 1: Range 1 Standalone (Release 15), total 49 pages.

3GPP TS 38.331 V16.2.0 (Sep. 2020), 3rd Generation Partnership Project; Technical Specification Group Radio Access Network; NR; Radio Resource Control (RRC) protocol specification (Release 16), total 921 pages.

PCT International Search Report for Application No. PCT/CN2021/138707 dated Dec. 16, 2021, 10 pages.

* cited by examiner

1

METHOD FOR DETERMINING FEATURE OF TERMINAL AND COMMUNICATION APPARATUS

CROSS-REFERENCE TO RELATED APPLICATIONS

This application is a continuation of International Application No. PCT/CN2021/138707, filed on Dec. 16, 2021, which claims priority to Chinese Patent Application No. 202011628056.3, filed on Dec. 31, 2020. The disclosures of the aforementioned applications are hereby incorporated by reference in their entireties.

TECHNICAL FIELD

This application relates to the communication field, and more specifically, to a method for determining a feature of a terminal and a communication apparatus.

BACKGROUND

A design of a feature of a terminal in existing new radio (NR) results in high costs and chip complexity during large-scale production of various types of terminals, and high power consumption of the terminals. Therefore, in research on a next generation technology (or a 6th generation (6G) communication technology), a design of a feature of a terminal needs to be further optimized.

SUMMARY

This application provides a method for determining a feature of a terminal and a communication apparatus, to customize a feature of a terminal, simplify a design of a terminal chip, reduce costs of the terminal chip, reduce implementation complexity of the chip and the terminal, and reduce energy consumption of the terminal.

According to a first aspect, this application provides a method for determining a feature of a terminal.

First, a terminal (or a module or unit in the terminal) determines a feature set, where the feature set may include a mandatory feature set and an optional feature set, the mandatory feature set is related to a type of the terminal, the mandatory feature set is a non-empty set, and the optional feature set may be an empty set or a non-empty set.

Then, the terminal may communicate with a network device based on a feature in the determined feature set.

In the method for determining a feature of a terminal provided in this application, the mandatory feature set is related to the type of the terminal. In this way, a mandatory feature set may be separately defined for different types of terminals. This can customize the feature of the terminal, help minimize the feature of the terminal, meet feature requirements of different types of terminals, reduce chip costs and terminal implementation processing complexity, and implement terminal energy saving.

In some implementations, the feature set of the terminal includes a first feature, and the first feature may be a mandatory feature or an optional feature. A default value of the first feature and/or a candidate value set of the first feature are/is related to the type of the terminal. In other words, a default value or a candidate value set of a feature may be separately defined for different types of terminals.

In a conventional technology, a default value and/or a candidate value set of a feature are/is defined only for enhanced mobile broadband (eMBB). When the default value and/or the candidate value are/is applicable to a plurality of different types of terminals, values of some features may not be applicable to terminals of other terminal types, resulting in high signaling overheads. However, in an example embodiment described herein, a default value or a candidate value set of a feature may be separately defined for different types of terminals. This meets feature requirements of different types of terminals, reduces chip costs and signaling overheads, implements terminal energy saving, and improves communication efficiency.

In some implementations, a second feature in the feature set needs to be determined through signaling interaction. In this case, the terminal may further receive first indication information from the network device, where the first indication information indicates enabling or disabling of the second feature, or indicates a value of the second feature; and enable or disable the second feature or determine the value of the second feature based on the first indication information. In this way, the feature can be flexibly enabled or disabled. Optionally, after receiving the first indication information, the terminal may further send first acknowledgment information to the network device, where the first acknowledgment information indicates that the second feature is enabled or disabled, or indicates that the first indication information is correctly received. In this way, it can be ensured that the terminal and the network device have a consistent understanding of the feature set of the terminal, so that communication robustness and reliability are enhanced, and communication performance is improved.

In some implementations, a third feature in the feature set needs to be determined through signaling interaction. In this case, the terminal sends second indication information to the network device, where the second indication information indicates enabling or disabling of the third feature, or indicates a value of the third feature. The terminal recommends or notifies the network device of enabling, disabling, or a value of a feature of the terminal. This can better adapt to an environment or service requirement, improve flexibility of enabling the feature, reduce power consumption of the terminal, implement energy saving, and improve communication performance. Optionally, the terminal may further receive second acknowledgment information sent by the network device, where the second acknowledgment information indicates that the third feature is enabled or disabled, or indicates the value of the third feature, or indicates that the second indication information is received correctly. In this way, it can be ensured that the terminal and the network device have a consistent understanding of the feature set of the terminal, so that communication robustness and reliability are enhanced, and communication performance is improved.

In some implementations, types of different terminals have at least one of the following different attributes: a supported service type, a mobility requirement, a service data transmission latency requirement, a radio channel environment, a service data transmission reliability requirement, a coverage requirement, and a deployment scenario.

In the method for determining a feature of a terminal provided in this application, considering that types of different terminals have different attributes, for example, a service type, mobility, a latency requirement, a reliability requirement, and a coverage requirement, features of different terminals are determined. According to the method, features of different terminals may be designed for different attributes, to meet communication requirements of each attribute, improve communication performance, and implement terminal energy saving.

In some implementations, the type of the terminal is one of the following: an eMBB terminal, an ultra-reliable and low-latency communication (URLLC) terminal, an internet of things (IoT) terminal, customer premise equipment (CPE), an augmented reality (AR) terminal, a virtual reality (VR) terminal, a machine type communication (MTC) terminal, and a vehicle to everything (V2X) terminal.

In the method for determining a feature of a terminal provided in this application, considering types of different terminals such as an eMBB terminal, a URLLC terminal, an IoT terminal, and a V2X terminal, features of different terminals are determined. According to the method, features of different terminals may be designed for types of different terminals, to meet communication requirements of types of various terminals, improve communication performance, and implement terminal energy saving.

In some implementations, if the type of the terminal is a first type, the mandatory feature set includes a positioning feature and a sidelink communication feature; if the type of the terminal is a second type, the mandatory feature set includes a sensing feature and a non-terrestrial network (NTN) communication feature; and/or if the type of the terminal is a third type, the mandatory feature set includes an artificial intelligence (AI) feature.

In some implementations, if the type of the terminal is the first type, the mandatory feature set further includes an air interface communication feature, where the air interface communication feature includes at least one of the following features: ultra-low latency processing timing, a cyclic prefix-orthogonal frequency division multiplexing (CP-OFDM) waveform, data transmission based on configured grant, slot aggregation, a quantity 2 of hybrid automatic repeat request (HARQ) processes, synchronization signal block based radio link management and/or radio resource management, aperiodic channel state information measurement and reporting, beam tracking, and beam management; and/or the positioning feature includes at least one of the following features: a positioning feature based on a downlink (DL) angle of departure (AOD), a positioning feature based on a downlink-time difference of arrival (DL-TDOA), a bandwidth size of a positioning reference signal, a quantity of downlink positioning reference signal resources, and support of sending a periodic sounding reference signal (SRS) used for positioning; and/or if the type of the terminal is the second type, the mandatory feature set further includes an air interface communication feature, where the air interface communication feature includes at least one of the following features: a low-cost waveform, data channel repetition, data transmission based on configured grant, slot aggregation, and a quantity 1 of HARQ processes.

According to a second aspect, this application provides a method for determining a feature of a terminal. The method can be implemented on a network device side corresponding to the first aspect. For beneficial effects of the method, refer to descriptions of beneficial effects in the first aspect.

First, a network device (or a module or unit in the network device) determines a feature set of a terminal based on a type of the terminal, where the feature set may include a mandatory feature set and an optional feature set, the mandatory feature set is related to the type of the terminal, the mandatory feature set is a non-empty set, and the optional feature set may be an empty set or a non-empty set.

Then, the network device communicates with the terminal based on a feature in the feature set.

In some implementations, the feature set of the terminal includes a first feature, and the first feature may be a mandatory feature or an optional feature. A default value of the first feature and/or a candidate value set of the first feature are/is related to the type of the terminal. In other words, a default value or a candidate value set of a feature may be separately defined for different types of terminals.

In some implementations, a second feature in the feature set needs to be determined through signaling interaction. In this case, the network device may further send first indication information to the terminal, where the first indication information indicates enabling or disabling of the second feature, or indicates a value of the second feature. Optionally, the network device may further receive first acknowledgment information sent by the terminal, where the first acknowledgment information indicates that the second feature is enabled or disabled, or indicates that the first indication information is correctly received.

In some implementations, a third feature in the feature set needs to be determined through signaling interaction. In this case, the network device may further receive second indication information sent by the terminal, where the second indication information indicates enabling or disabling of the third feature, or indicates a value of the third feature. Optionally, the network device may further send second acknowledgment information to the terminal, where the second acknowledgment information indicates that the third feature is enabled or disabled, or indicates the value of the third feature, or indicates that the second indication information is received correctly.

In some implementations, types of different terminals have at least one of the following different attributes: a supported service type, a mobility requirement, a service data transmission latency requirement, a radio channel environment, a service data transmission reliability requirement, a coverage requirement, and a deployment scenario.

In some implementations, the type of the terminal is one of the following: an eMBB terminal, a URLLC terminal, an IoT terminal, CPE, an AR terminal, a VR terminal, an MTC terminal, and a V2X terminal.

In some implementations, if the type of the terminal is a first type, the mandatory feature set includes a positioning feature and a sidelink communication feature; if the type of the terminal is a second type, the mandatory feature set includes a sensing feature and a non-terrestrial network NTN communication feature; and/or if the type of the terminal is a third type, the mandatory feature set includes an artificial intelligence AI feature.

In some implementations, if the type of the terminal is the first type, the mandatory feature set further includes an air interface communication feature, where the air interface communication feature includes at least one of the following features: ultra-low latency processing timing, a cyclic prefix-orthogonal frequency division multiplexing CP-OFDM waveform, data transmission based on configured grant, slot aggregation, a quantity 2 of hybrid automatic repeat request HARQ processes, synchronization signal block based radio link management and/or radio resource management, aperiodic channel state information measurement and reporting, beam tracking, and beam management; and/or the positioning feature includes at least one of the following features: a positioning feature based on a downlink angle of departure, a positioning feature based on a downlink time difference of arrival, a bandwidth size of a positioning reference signal, a quantity of downlink positioning reference signal resources, and support of sending a periodic sounding reference signal used for positioning; and/or if the type of the terminal is the second type, the mandatory feature set further includes an air interface communication feature, where the air interface communication feature includes at least one of the following features: a low-cost waveform, data channel repetition, data transmission based on configured grant, slot aggregation, and a quantity 1 of HARQ processes.

According to a third aspect, this application provides a communication apparatus. The apparatus includes a module configured to perform the method according to any one of the first aspect or the possible implementations of the first aspect, or includes a module configured to perform the method according to any one of the second aspect or the possible implementations of the second aspect.

According to a fourth aspect, a communication apparatus is provided. The communication apparatus includes a processor. The processor is coupled to a memory, and may be configured to execute instructions in the memory, to implement the method according to any one of the possible implementations of the first aspect. Optionally, the apparatus further includes the memory. Optionally, the apparatus further includes a communication interface, and the processor is coupled to the communication interface.

In an implementation, the apparatus is a terminal device. When the apparatus is the terminal device, the communication interface may be a transceiver or an input/output interface.

In another implementation, the apparatus is a chip disposed in a terminal device. When the apparatus is the chip disposed in the terminal device, the communication interface may be an input/output interface.

Optionally, the transceiver may be a transceiver circuit. Optionally, the input/output interface may be an input/output circuit.

According to a fifth aspect, this application provides a communication apparatus. The communication apparatus includes a processor. The processor is coupled to a memory, and may be configured to execute instructions in the memory, to implement the method according to any one of the possible implementations of the second aspect. Optionally, the apparatus further includes the memory. Optionally, the apparatus further includes a communication interface, and the processor is coupled to the communication interface.

In an implementation, the apparatus is a network device. When the apparatus is the network device, the communication interface may be a transceiver or an input/output interface.

In another implementation, the apparatus is a chip disposed in a network device. When the apparatus is the chip disposed in the network device, the communication interface may be an input/output interface.

Optionally, the transceiver may be a transceiver circuit. Optionally, the input/output interface may be an input/output circuit.

According to a sixth aspect, this application provides a processor. The processor includes an input circuit, an output circuit, and a processing circuit. The processing circuit is configured to: receive a signal by using the input circuit, and output a signal by using the output circuit, to enable the processor to perform the method according to any one of the possible implementations of the first aspect or the second aspect.

In a specific implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a seventh aspect, this application provides a communication apparatus. The communication apparatus includes a processor and a memory. The processor is configured to: read instructions stored in the memory, receive a signal through a receiver, and transmit a signal through a transmitter, to perform the method according to any one of the possible implementations of the first aspect or the second aspect.

Optionally, there are one or more processors, and there are one or more memories.

Optionally, the memory may be integrated with the processor, or the memory and the processor are separately disposed.

In a specific implementation, the memory may be a non-transitory memory, for example, a read-only memory (ROM). The memory and the processor may be integrated into one chip, or may be separately disposed in different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The apparatus in the seventh aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently of the processor.

According to an eighth aspect, this application provides a computer-readable storage medium. The computer-readable storage medium stores a computer program or instructions. When the computer program or the instructions are executed, the method according to any one of the possible implementations of the first aspect or the second aspect is implemented.

According to a ninth aspect, this application provides a computer program product, including instructions. When the instructions are run, the method according to any one of the possible implementations of the first aspect or the second aspect is implemented.

According to a tenth aspect, this application provides a communication system. The communication system includes a terminal and a network device.

DESCRIPTION OF EMBODIMENTS

Figure 1:
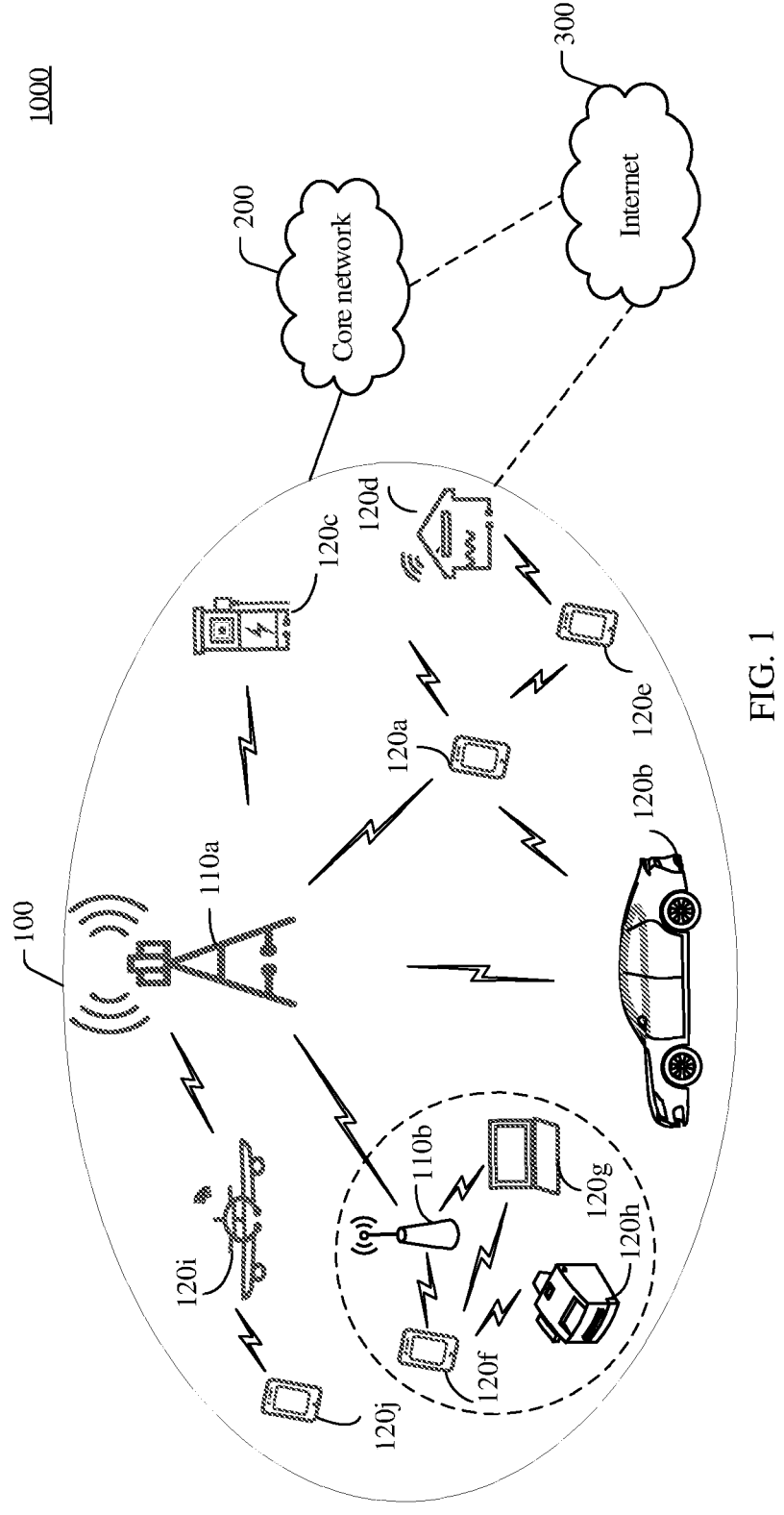
FIG. 1 is an example schematic diagram of an architecture of a communication system to which an embodiment of this application is applied.

For ease of understanding, the following describes concepts related to this application.

1. eMBB

An eMBB service refers to further improvement of performance such as a network speed and user experience based on an existing mobile broadband service scenario, which is also an application scenario closest to our daily life. For example, when a user watches a 4K high-definition video, a peak rate can reach 10 Gbps. For example, the eMBB service may be a heavy-traffic mobile broadband service, for example, a three-dimensional (3D)/ultra-high-definition video.

2. URLLC

A URLLC service may include services in the following various scenarios: industrial application and control, traffic safety and control, remote manufacturing, remote training, remote surgery, self-driving, security protection, and the like.

3. MTC

An MTC service may be a low-cost service with enhanced coverage, and is also referred to as a machine-to-machine (M2M) service or a massive machine-type communication (mMTC) service.

4. IoT

An IoT service may be a service that has features such as wide coverage, a large quantity of connections, a low rate, low costs, low power consumption, and an optimal architecture. For example, the IoT service may be applied to scenarios such as a smart water meter, smart parking, smart pet tracking, a smart bicycle, a smart smoke detector, a smart toilet, and a smart vending machine.

An IoT terminal may be a sensor, a controller, or the like, for example, a temperature sensor, a humidity sensor, a fire alarm, or a detector. The IoT terminal may alternatively be an MTC terminal, a narrowband IoT (NB-IoT) terminal, or an mMTC terminal.

5. CPE

The CPE may be understood as a relay device of a mobile communication network and a Wi-Fi network, and may send information received in the mobile communication network to a terminal by using a Wi-Fi signal, or send information received in the Wi-Fi network to a base station through an air interface of the mobile communication network. The CPE has two wireless communication interfaces. One is an air interface of the mobile communication network and is configured to communicate with the base station in the mobile communication network, and the other is a Wi-Fi wireless communication interface and is configured to communicate with the terminal. The mobile communication network herein may be any mobile communication network, for example, may be a 4th generation (4G) mobile communication network, a 5th generation (5G) mobile communication network, a 6G mobile communication network, or a future mobile communication network. The CPE can support access of a plurality of terminals at the same time. The CPE can be widely used in application scenarios such as rural areas, towns, hospitals, offices, factories, and residential areas, which can reduce costs of wired network deployment and replace wired broadband.

6. Vehicle to Everything

The vehicle to everything (V2X) is a key technology in a future intelligent transportation system. The V2X can enable communication between vehicles, between a vehicle and a base station, and between base stations. In this way, a series of traffic information such as a real-time road condition, road information, and pedestrian information can be obtained. This improves driving safety, reduces congestion, and improves traffic efficiency, and may further provide in-vehicle entertainment information and the like.

7. Feature of a Terminal

In this application, the feature may also be replaced with a capability, a function, a characteristic, a feature capability, or the like. In other words, the feature of the terminal may also be described as a capability of the terminal, a function of the terminal, a characteristic of the terminal, a feature capability of the terminal, or the like. The following provides descriptions by uniformly using the feature.

The feature of the terminal may include a mandatory feature and an optional feature.

A feature set is a set including features of one or more terminals.

8. Mandatory Feature

The mandatory feature is a basic feature of the terminal and needs to be supported by the terminal. In this application, a feature set including mandatory features may also be described as a minimum feature set, a mandatory feature set, or the like.

A main scenario studied in the NR standard is an eMBB scenario. Therefore, a mandatory feature of a terminal is defined for the eMBB.

For example, in a conventional technology, the following features are specified as mandatory features.

(1) Quantity 16 of Supported HARQ Processes (2) Channel Bandwidth

In the conventional technology, the terminal needs to support various channel bandwidths of carriers and frequency bands in Table 1.

For example, as shown in Table 1, in a frequency band n1, the terminal needs to support a bandwidth of 20 MHz; in a frequency band n2, the terminal needs to support a bandwidth of 20 MHz; in a frequency band n3, the terminal needs to support a bandwidth of 30 MHz; and so on.

TABLE 1

| NR frequency band | Subcarrier spacing kHz | Channel bandwidth | | | | | | | | | | | | |
|---|---|---|---|---|---|---|---|---|---|---|---|---|---|---|
| | | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
| n1 | 15 | Yes | Yes | Yes | Yes | | | | | | | | | |
| | 30 | | Yes | Yes | Yes | | | | | | | | | |
| | 60 | | Yes | Yes | Yes | | | | | | | | | |
| n2 | 15 | Yes | Yes | Yes | Yes | | | | | | | | | |
| | 30 | | Yes | Yes | Yes | | | | | | | | | |
| | 60 | | Yes | Yes | Yes | | | | | | | | | |
| n3 | 15 | Yes | Yes | Yes | Yes | Yes | Yes | | | | | | | |
| | 30 | | Yes | Yes | Yes | Yes | Yes | | | | | | | |
| | 60 | | Yes | Yes | Yes | Yes | Yes | | | | | | | |
| n5 | 15 | Yes | Yes | Yes | Yes | | | | | | | | | |
| | 30 | | Yes | Yes | Yes | | | | | | | | | |
| | 60 | | | | | | | | | | | | | |
| n7 | 15 | Yes | Yes | Yes | Yes | Yes | Yes | Yes | Yes | | | | | |
| | 30 | | Yes | Yes | Yes | Yes | Yes | Yes | Yes | | | | | |
| | 60 | | Yes | Yes | Yes | Yes | Yes | Yes | Yes | | | | | |

(3) Waveform

In the conventional technology, for downlink transmission, the terminal needs to support an orthogonal frequency division multiplexing (OFDM) waveform. For uplink transmission, the terminal needs to support an OFDM waveform and a discrete Fourier transform-spread OFDM (DFT-S-OFDM) waveform.

(4) Modulation Scheme

In the conventional technology, for data transmission in a frequency range 1 (FR1), the terminal needs to support 64 quadrature amplitude modulation (QAM).

(5) Physical Downlink Shared Channel (PDSCH)

In the conventional technology, the terminal needs to support interleaving for virtual resource block-to-physical resource block mapping (interleaving for VRB-to-PRB mapping).

(6) Cell Handover (7) Neighboring Cell Measurement

9. Optional Feature

The optional feature is a capability that may or may not supported by the terminal.

For example, in the conventional technology, the following features are specified as optional features.

(1) Positioning Feature

The positioning feature includes a basic positioning reference signal (PRS) processing capability.

For example, the terminal sends a PRS, and the base station determines a location of the terminal based on the PRS.

For example, the terminal receives a PRS, and the terminal determines a location of the terminal based on the PRS and a location of the base station.

(2) Sidelink Communication Feature

The sidelink communication feature includes a basic sidelink communication capability, for example, receiving and sending of sidelink information. The sidelink information may include at least one of the following: a sidelink control channel (SCCH), a sidelink shared channel (SSCH), and a sidelink feedback channel (SFCH).

(3) Physical Uplink Shared Channel (PUSCH) Processing Capability 2 of the Terminal The PUSCH processing capability of the terminal may be referred to as PUSCH preparation time for short.

The PUSCH processing capability of the terminal may be time from receiving, by the terminal, a physical downlink control channel (PDCCH) to transmitting, by the terminal, a PUSCH, where the PDCCH carries downlink control information (DCI), and the DCI is used to schedule the PUSCH.

The PUSCH processing capability includes a capability 1 and a capability 2.

For example, Table 2 shows a PUSCH processing capability 1, Table 3 shows a PUSCH processing capability 2, and Table 4 shows a frame structure parameter. In Table 2 and Table 3, $\mu$ represents subcarrier spacing configuration information, and a value of $\mu$ is shown in Table 4.

TABLE 2

| $\mu$ | PUSCH preparation time $N_2$ [symbol] |
|---|---|
| 0 | 10 |
| 1 | 12 |
| 2 | 23 |
| 3 | 36 |

TABLE 3

| $\mu$ | PUSCH preparation time $N_2$ [symbol] |
|---|---|
| 0 | 5 |
| 1 | 5.5 |
| 2 | 11 for a frequency range 1 |

TABLE 4

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal and extended |
| 3 | 120 | Normal |
| 4 | 240 | Normal |

(4) PDSCH Repetition

A plurality of repeated data transmissions can be performed through one scheduling. The plurality of data transmissions may occupy a plurality of slots. A quantity of repetitions may be predefined, may be indicated by using higher layer signaling, or may be indicated by using physical layer signaling. A plurality of pieces of repeated data may be same data of different redundancy versions. A bit rate can be reduced through data transmission in this manner, and a diversity gain is obtained through the plurality of repeated transmissions. This improves data transmission reliability and coverage.

(5) Downlink Semi-Persistent Scheduling (SPS)

A plurality of transmissions may be scheduled by using one piece of DCI, and a quantity of the plurality of transmissions may be predefined. Alternatively, SPS transmission is terminated by using DCI. SPS based data transmission can implement fast large-packet data transmission, reduce DCI signaling overheads, and reduce a transmission latency.

(6) Configured Grant, Also Referred to as Grant Free

Configured grant type 1: Data is transmitted based on scheduling information configured by using radio resource control (RRC) signaling, and there may be no DCI for indication.

Configured grant type 2: Data is transmitted based on scheduling information configured by using RRC signaling, and DCI is required for activation and deactivation.

Data transmission based on the configured grant type can implement fast data transmission of the terminal without scheduling by using the DCI, and reduce a transmission latency.

10. Default Value and Candidate Value Set of a Feature of a Terminal

If the feature of the terminal does not need to be confirmed by the terminal by interacting with another device (for example, another terminal or a base station), the feature may be determined as the default value. The default value may be predefined in a protocol. For example, a value of a feature is directly defined in the protocol. For another example, it is defined in the protocol that a value in a candidate value set is selected as a default value of a feature. The candidate value set includes a possible value of a feature of a terminal.

The terminal may report whether a feature is supported, and/or report a supported value. For a feature, if the terminal reports one or more supported values, a network device may determine a value of the feature based on the one or more values reported by the terminal; or if the terminal reports no value, a network device uses a value by default, and the value is a default value.

11. Type of a Terminal

In this application, types of different terminals have at least one of the following different attributes: a supported service type, a mobility requirement, a service data transmission latency requirement, a radio channel environment, a service data transmission reliability requirement, a coverage requirement, and a deployment scenario.

Alternatively, the type of the terminal is at least one of the following: an eMBB terminal, a URLLC terminal, an IoT terminal, CPE, an AR terminal, a VR terminal, an MTC terminal, and a V2X terminal.

Optionally, the type of the terminal may alternatively be a service type of the terminal.

The following describes technical solutions of this application with reference to the accompanying drawings.

FIG. 1 is a schematic diagram of an architecture of a communication system 1000 to which an embodiment of this application is applied. As shown in FIG. 1, the communication system includes a radio access network 100 and a core network 200. Optionally, the communication system 1000 may further include an internet 300. The radio access network 100 may include at least one radio access network device (for example, 110a and 110b in FIG. 1), and may further include at least one terminal (for example, 120a to 120j in FIG. 1). The terminal is connected to the radio access network device in a wireless manner, and the radio access network device is connected to the core network in a wireless or wired manner. A core network device and the radio access network device may be different independent physical devices. Alternatively, functions of a core network device and logical functions of the radio access network device may be integrated into a same physical device. Alternatively, a part of functions of a core network device and a part of functions of the radio access network device may be integrated into one physical device. A connection between terminals and a connection between radio access network devices each may be implemented in a wired or wireless manner. FIG. 1 is only a schematic diagram. The communication system may further include another network device, for example, may further include a wireless relay device and a wireless backhaul device, which are not shown in FIG. 1.

The radio access network device may be a base station, an evolved NodeB (eNodeB), a transmission reception point (TRP), a next generation NodeB (gNB) in a 5th generation (5G) mobile communication system, a next generation NodeB in a 6th generation (6G) mobile communication system, a base station in a future mobile communication system, an access node in a Wi-Fi system, or the like; or may be a module or a unit that implements a part of functions of a base station, for example, may be a central unit (CU) or a distributed unit (DU). The radio access network device may be a macro base station (for example, 110a in FIG. 1), a micro base station or an indoor base station (for example, 110b in FIG. 1), a relay node, a donor node, or the like. A specific technology and a specific device form that are used by the radio access network device are not limited in embodiments of this application. For ease of description, in the following descriptions, the radio access network device is briefly referred to as a network device, and two terms "network device" and "base station" may be interchanged.

In FIG. 1, the terminal may be located in cell coverage of the network device. The terminal may perform air interface communication with the network device over an uplink (UL) or a downlink (DL). In a UL direction, the terminal may send data to the network device. In a DL direction, the network device may send control information to the terminal, or may send data to the terminal. In other words, the terminal may receive the control information and/or the data sent by the network device.

In embodiments of this application, the terminal may also be referred to as a terminal device, user equipment (UE), a mobile station, a mobile terminal, or the like. The terminal may be widely used in various scenarios, such as device-to-device (D2D), V2X communication, MTC, IoT, virtual reality, augmented reality, industrial control, self-driving, telemedicine, a smart grid, smart furniture, a smart office, smart wear, smart transportation, and a smart city. The terminal may be a mobile phone, a tablet computer, a computer with a wireless transceiver function, a wearable device, a vehicle, an unmanned aerial vehicle, a helicopter, an aircraft, a ship, a robot, a robot arm, a smart household, or the like. A specific technology and a specific device form that are used by the terminal are not limited in embodiments of this application.

Application scenarios of the network device and the terminal are not limited in embodiments of this application. For example, the network device and/or the terminal may be deployed on land, including an indoor or outdoor device, a handheld device, or a vehicle-mounted device; may be deployed on a water surface; or may be deployed on an aircraft, a balloon, or an artificial satellite in the air.

Roles of the network device and the terminal may be relative. For example, a helicopter or an unmanned aerial vehicle 120*i* in FIG. 1 may be configured as a mobile base station. For the terminal 120*j* that accesses the radio access network 100 through 120*i*, the terminal 120*i* is a base station. However, for the base station 110*a*, 120*i* is a terminal. In other words, 110*a* and 120*i* communicate with each other according to a wireless air interface protocol. Certainly, 110*a* and 120*i* may alternatively communicate with each other according to an interface protocol between base stations. In this case, for 110*a*, 120*i* is also a base station. Therefore, the base station and the terminal may be collectively referred to as communication apparatuses. 110*a* and 110*b* in FIG. 1 may be referred to as communication apparatuses having a base station function, and 120*a* to 120*j* in FIG. 1 may be referred to as communication apparatuses having a terminal function.

In embodiments of this application, communication between a network device and a terminal, communication between network devices, and communication between terminals each may be performed by using a licensed spectrum, or may be performed by using an unlicensed spectrum, or may be performed by using both a licensed spectrum and an unlicensed spectrum. Embodiments of this application are applicable to a low-frequency scenario (sub 6G), and are further applicable to a high-frequency scenario (above 6G), terahertz, optical communication, and the like. For example, the communication between the network device and the terminal may be performed by using a spectrum below 6 gigahertz (GHz), may be performed by using a spectrum above 6 GHz, or may be performed by using both a spectrum below 6 GHz and a spectrum above 6 GHz. A spectrum resource used for communication is not limited in embodiments of this application.

In embodiments of this application, functions of the network device may alternatively be performed by a module (for example, a chip) in the network device, or may be performed by a control subsystem including the functions of the network device. Herein, the control subsystem including the functions of the network device may be a control center in the foregoing terminal application scenarios such as a smart grid, industrial control, smart transportation, and a smart city. Functions of the terminal may be performed by a module (for example, a chip or a modem) in the terminal, or may be performed by an apparatus including the functions of the terminal.

It may be understood that, in embodiments of this application, a PDSCH, a PDCCH, and a PUSCH are only used as examples of a downlink data channel, a downlink control channel, and an uplink data channel. In different systems and different scenarios, a data channel and a control channel may have different names. This is not limited in embodiments of this application.

In embodiments of this application, a measurement unit of communication in time domain may be referred to as a time unit or a time scheduling unit. The time scheduling unit or the time unit may be a radio frame, a subframe, a slot, a mini-slot, a sub-slot, or the like. The time scheduling unit or the time unit may alternatively be one or more symbols or the like, where the symbol is a basic unit in time domain. In this application, a slot is used as an example for description. The slot may be a time unit, and may be replaced with the foregoing example of the time unit. This is not limited in this application.

In embodiments of this application, a measurement unit of communication in frequency domain may be referred to as a frequency domain resource element or a frequency domain scheduling unit. The frequency domain resource element may be a basic resource element (RE), a resource block, a resource block group, or the like. One resource block may include one or more resource elements. One resource block group may include one or more resource blocks. For example, a frequency domain resource element used for data transmission may include several basic resource elements. One RE may correspond to one subcarrier. One physical resource block (PRB) includes X1 basic resource elements, where X1 is an integer greater than or equal to 1. For example, X1 is 12. In this application, a resource block is used as an example for description. The resource block may be a frequency domain resource element, and may be replaced with the foregoing example of the frequency domain resource element. This is not limited in this application.

In embodiments of this application, the higher layer signaling may be at least one of RRC signaling, media access control (MAC) signaling, radio link control (RLC) signaling, and the like. In this application, RRC signaling is used as an example for description. The RRC signaling may be higher layer signaling, and may be replaced with the foregoing example of the higher layer signaling. This is not limited in this application.

In embodiments of this application, the physical layer signaling may be at least one of downlink control information (DCI), receive control information (RCI), uplink control information (UCI), and transmit control information (TxCI). In this application, DCI is used as an example for description. The DCI may be physical layer signaling, and may be replaced with the foregoing example of the physical layer signaling. This is not limited in this application.

In the NR standard, a mandatory feature of a terminal is defined for an eMBB terminal. During research, features of other types of terminals (such as a URLLC terminal and an IoT terminal) are obtained through superimpose based on that of the eMBB terminal, and most features are optional features. As a result, costs and chip complexity during large-scale production of various types of terminals are high, and power consumption of the terminals is high. The following is an example of analysis.

1. Mandatory Feature

For other types of terminals, some mandatory features of the eMBB terminal may not need to be supported. If the other types of terminals need to support all mandatory features of the eMBB terminal, chip costs, power consumption of the terminals, and chip complexity are high. Consequently, large-scale commercial use of the other types of terminals is unfavorable.

For example, if a quantity of HARQ processes is 16, the terminal needs to support a strong storage capability. Therefore, if the other types of terminals need to support 16 HARQ processes, chip costs and energy consumption are high, and capabilities are weak. For a terminal that transmit only small-packet data, for example, an IoT terminal, a low-cost requirement cannot be met.

For example, for a channel bandwidth, the IoT terminal does not need to support a bandwidth of 20 MHz, and can support a bandwidth of only 5 MHz or less. According to the current design, costs are high.

For example, for a small-packet data transmission service, 64QAM does not need to be supported, and only 16QAM and quadrature phase shift keying (QPSK) may be supported. According to the current design, costs and power consumption are high.

2. Optional Feature

For other types of terminals, many significant features are defined as optional features. As a result, the terminals cannot meet service feature requirements, transmission performance is reduced, and large-scale commercial use in the industry is unfavorable.

For example, for an IoT terminal, to meet a deep coverage requirement, repeated data transmission is an important feature. When the repeated data transmission is an optional feature, coverage and performance are limited.

For example, for a URLLC terminal, to meet low-latency and high-reliability communication requirements, a PUSCH processing capability 2 and configured grant of the terminal are key features. When the PUSCH processing capability 2 and the configured grant are optional features, processing time is long, and a latency is high. Consequently, the low-latency requirement cannot be met.

3. In the conventional technology, candidate value sets or default values of features corresponding to different types of For example, a candidate value set of a quantity, of MIMO layers for uplink transmission, supported by the terminal may include 1, 2, and 4. If the candidate value set is represented in binary, each candidate value needs to be indicated by using two bits. A feature parameter MIMO-LayersUL is used as an example:

MIMO-LayersUL::=ENUMERATED{oneLayer, two-Layers, fourLayers}

For example, in an FR1, a candidate value set of a bandwidth supported by the terminal may include 5 MHz, 10 MHz, 15 MHz, 20 MHz, 25 MHz, 30 MHz, 40 MHz, 50 MHz, 60 MHz, 80 MHz, and 100 MHz. If the candidate value set is represented in binary, each candidate value needs to be indicated by using four bits. In an FR2, a candidate value set of a bandwidth supported by the terminal may include 50 MHz, 100 MHz, 200 MHz, and 400 MHz. If the candidate value set is represented in binary, each candidate value needs to be indicated by using two bits. A feature parameter SupportedBandwidth is used as an example:

```
SupportedBandwidth::=CHOICE{
    fr1    ENUMERATED{mhz5, mhz10, mhz15, mhz20, mhz25, mhz30, mhz40,
mhz50, mhz60, mhz80, mhz100},
    fr2       ENUMERATED{mhz50, mhz100, mhz200, mhz400}
}
``` terminals are fixed and the same. According to the unified design, overheads for reporting a feature value may be high. Consequently, communication performance is reduced.

For example, a candidate value set of a modulation order feature may include bpsk-halfpi, bpsk, qam16, qam64, and qam256. If the candidate value set is represented in binary, each candidate value needs to be indicated by using three bits. A feature parameter ModulationOrder is used as an example:

ModulationOrder::=ENUMERATED{bpsk-halfpi, bpsk, qpsk, qam16, qam64, qam256}

For example, a candidate value set of a maximum quantity, of channel state information-reference signal (CSI-RS) resources used for radio link measurement (RLM), supported by the terminal may include 2, 4, 6, and 8. If the candidate value set is represented in binary, each candidate value needs to be indicated by using two bits. A feature parameter maxNumberResource-CSI-RS-RLM is used as an example:

maxNumberResource-CSI-RS-RLM
ENUMERATED{n2, n4, n6, n8} OPTIONAL

For example, a candidate value set of a maximum quantity, of CSI-RS resources used for radio resource management (RRM), supported by the terminal may include 4, 8, 16, 32, 64, and 96. If the candidate value set is represented in binary, each candidate value needs to be indicated by using three bits. A feature parameter maxNumberCSI-RS-RRM-RS-SINR is used as an example:

maxNumberCSI-RS-RRM-RS-SINR      ENUMERATED {n4, n8, n16, n32, n64, n96} OPTIONAL For example, a candidate value set of a quantity, of multiple-input multiple-output (MIMO) layers for downlink transmission, supported by the terminal may include 2, 4, and 8. If the candidate value set is represented in binary, each candidate value needs to be indicated by using two bits. A feature parameter MIMO-LayersDL is used as an example:

MIMO-LayersDL::=ENUMERATED{twoLayers, four-Layers, eightLayers}

With development of the industry, a mainstream terminal is no longer a terminal of a specific type. Instead, a plurality of types of terminals become mainstream terminals. For example, an eMBB terminal, a URLLC terminal, an IoT terminal, CPE, and a V2X terminal all become mainstream terminals. If an existing NR design is still used for a feature of a terminal, costs and chip complexity during large-scale production of various types of terminals are high, and power consumption of the terminals is high. Therefore, in research on a next generation technology or a 6G communication technology, a design of a feature of a terminal needs to be further optimized.

To resolve the foregoing problem, this application provides a method for determining a feature of a terminal, to customize and minimize a feature of a terminal, meet feature requirements of different types of terminals, reduce chip costs and terminal implementation processing complexity, and implement terminal energy saving.

Figure 2:
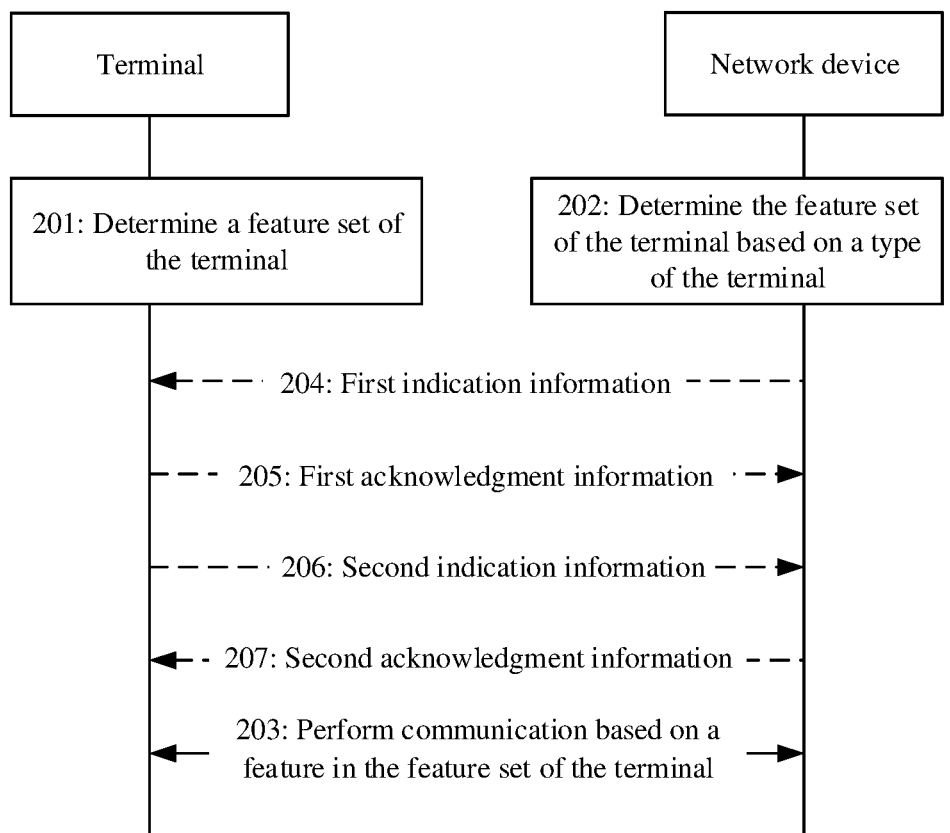
FIG. 2 is an example schematic flowchart of a method for determining a feature of a terminal according to an embodiment of this application.

FIG. 2 is a schematic flowchart of a method for determining a feature of a terminal according to an embodiment of this application. The method shown in FIG. 2 may be performed by a terminal and a network device, or may be performed by modules or units in the terminal and the network device. The following provides descriptions by using an example in which an execution body is the terminal and the network device.

Step 201: The terminal determines a feature set of the terminal.

The feature set is related to a type of the terminal.

The following describes in detail a relationship between the feature set and the type of the terminal.

Step 202: The network device determines the feature set of the terminal based on the type of the terminal.

Step 203: The terminal communicates with the network device based on a feature in the feature set of the terminal.

A sequence of step 201 and step 202 is not limited in this application. For example, step 201 may be performed before step 202, or step 202 may be performed before step 201, or step 201 and step 202 are performed at the same time.

The feature set of the terminal herein may be understood as a set of features supported by the terminal.

The feature set of the terminal may include a first set and a second set. A feature in the first set is a mandatory feature. The first set is a non-empty set, and is related to the type of the terminal. The first set may also be referred to as a minimum feature set of the terminal. A feature in the second set belongs to a set including an optional feature. In other words, a feature in the second set is an optional feature. The second set may be an empty set or a non-empty set.

In this application, features in feature sets may be defined for different types of terminals in a protocol. For example, the feature set includes a first feature, and the first feature is defined in the protocol. For example, a first feature set is defined for a first-type terminal. A second feature set is defined for a second-type terminal. In this case, for the terminal, determining the feature set of the terminal may be understood as detecting a current feature set of the terminal. For the network device, determining the feature set of the terminal may be obtaining, based on the type of the terminal, a feature set corresponding to the type.

In addition, the network device may obtain the type of the terminal from the terminal. For example, when the terminal is powered on, the terminal reports the type of the terminal to the network device, so that the network device determines the feature set of the terminal.

Optionally, when the network device is an access network device, the network device may obtain the type of the terminal from a core network device. For example, the terminal reports the type of the terminal to the core network device. The core network device sends the type of the terminal to the network device. The network device determines the type of the terminal based on the received type of the terminal sent by the core network device.

In this application, the feature set of the terminal includes the first feature, and a default value or a candidate value set of the first feature is related to the type of the terminal. The first feature may be a mandatory feature or an optional feature. The following describes in detail a relationship between the default value or the candidate value set of the first feature and the type of the terminal.

In some implementations, enabling, disabling, or a value of a feature in the feature set of the terminal may be predefined in a protocol. In this way, signaling overheads can be reduced.

In some other embodiments, enabling, disabling, or a value of a feature in the feature set of the terminal may alternatively be determined through signaling interaction between the terminal and the network device. In this way, the feature can be flexibly enabled or disabled, and power consumption of the terminal can be reduced.

The signaling interaction between the terminal and the network device may include at least one of the following: indicating, by the terminal, enabling or disabling of one or more features to the network device; indicating, by the terminal, a value of one or more features to the network device; indicating, by the network device, enabling or disabling of one or more features to the terminal; and indicating, by the network device, a value of one or more features to the terminal. The one or more features mentioned here may be a mandatory feature or an optional feature.

If the feature set of the terminal includes a second feature, and the network device indicates enabling or disabling of the second feature, or indicates a value of the second feature to the terminal, the terminal and the network device may further perform step 204 and step 205, where step 205 is an optional step.

Step 204: The network device sends first indication information to the terminal. Correspondingly, the terminal receives the first indication information sent by the network device.

The first indication information indicates the enabling or disabling of the second feature, or indicates the value of the second feature.

Optionally, the first indication information includes a first identifier, and the first identifier indicates the second feature.

In some implementations, if the network device indicates enabling, disabling, or a value of a single feature, the first identifier may be an identifier of the second feature. If the second feature includes one or more features, the first identifier correspondingly includes at least one identifier.

In some other implementations, the first indication information may further indicate enabling, disabling, or a value of a fifth feature.

In an example, there is an association relationship between the second feature and the fifth feature. The first identifier may be an identifier of the second feature. The network device may indicate enabling, disabling, or values of the second feature and the fifth feature by including the identifier of the second feature in the first indication information. In other words, the second feature may be bound to the fifth feature. When the second feature is enabled, the fifth feature is also enabled; when the second feature is enabled, the fifth feature is disabled; when the second feature is disabled, the fifth feature is enabled; or when the second feature is disabled, the fifth feature is also disabled.

In a possible implementation, the association relationship between the second feature and the fifth feature may be determined based on the type of the terminal.

Optionally, the association relationship herein may be predefined in a protocol, or may be notified by the network device to the terminal by using higher layer signaling, physical layer signaling, or the like.

For example, there may be an association relationship between a HARQ feedback feature and a data channel repetition feature. When the HARQ feedback feature is enabled, the data channel repetition feature is also enabled.

In another example, a set identifier may be defined for the feature set including the second feature and the fifth feature, and the first identifier may be the set identifier. When an indication corresponding to the set identifier is enabling, both the second feature and the fifth feature corresponding to the set identifier are enabled. When an indication corresponding to the set identifier is disabling, both the second feature and the fifth feature corresponding to the set identifier are disabled. When the set identifier may correspond to values of the second feature and the fifth feature, the network device may indicate the values of the second feature and the fifth feature by using the set identifier. In this way, the network device may indicate enabling, disabling, or values of the second feature and the fifth feature by including the set identifier in the first indication information.

In a possible implementation, a correspondence between a set identifier and a feature may be determined based on the type of the terminal.

Optionally, there is a correspondence between a set identifier and a feature. The correspondence may be predefined in a protocol, or may be notified by the network device to the terminal by using higher layer signaling, physical layer signaling, or the like.

For example, as shown in Table 5, the correspondence between a set identifier and a feature may be at least one row or at least one column in the table. The network device may indicate enabling or disabling of a feature a1 to a feature an by using a set identifier 1. The network device may indicate enabling or disabling of a feature b1 to a feature bn by using a set identifier 2. The network device may indicate values of a feature c1 to a feature cn by using a set identifier 3. an, bn, and cn may be the same or different.

TABLE 5

| Set identifier | Feature set |
| --- | --- |
| Set identifier 1 | Feature a1, feature a2, . . . , and feature an |
| Set identifier 2 | Feature b1, feature b2, . . . , and feature bn |
| Set identifier 3 | Value of a feature c1, value of a feature c2, . . . , and value of a feature cn |

In the foregoing joint indication manner, indication overheads can be reduced, and a feature can be flexibly enabled or disabled, so that terminal energy saving is implemented.

Step 205: The terminal sends a first acknowledgment information to the network device. Correspondingly, the network device receives the first acknowledgment information sent by the terminal.

The first acknowledgment information indicates that the second feature is enabled or disabled, or indicates whether the first indication information is successfully received.

1. The first acknowledgment information is physical layer signaling.

In an example, the first acknowledgment information may be uplink control information (UCI).

For example, the UCI may be scheduling request (SR) information. If the terminal sends the SR information, it indicates that the terminal correctly receives the first indication information. Alternatively, if a data bearer value included in the SR information is greater than or equal to (or greater than) XR1, it indicates that the terminal correctly receives the first indication information. Alternatively, if a data bearer value included in the SR information is less than (or less than or equal to) XR1, it indicates that the terminal does not correctly receive the first indication information.

For another example, the UCI may be acknowledgment (acknowledgment, ACK)/negative acknowledgment (NACK) information. If the terminal sends the ACK, it indicates that the terminal correctly receives the first indication information. If the terminal sends the NACK, it indicates that the terminal does not correctly receive the first indication information. Alternatively, a NACK only manner may be used. To be specific, the NACK is fed back only when receiving fails, or no NACK is fed back when receiving succeeds.

Optionally, the first acknowledgment information and a data feedback may be sent together. For example, when a data channel is scheduled by using DCI, the terminal may receive data carried on the data channel (for example, a PDSCH). When the data on the PDSCH is successfully decoded, the terminal feeds back an ACK, to indicate that the data is successfully received and the first indication information is successfully received. When the data on the PDSCH fails to be decoded, the terminal feeds back a NACK, to indicate that the data fails to be received and the first indication information fails to be received.

Optionally, the first acknowledgment information and a data feedback may be sent separately. For example, when a data channel is scheduled by using DCI, the terminal may receive data carried on the data channel (for example, a PDSCH). When the data on the PDSCH is successfully decoded, the terminal feeds back an ACK, to indicate that the data is successfully received. For the first indication information, the terminal may send an ACK, to indicate that the first indication information is successfully received. When the data on the PDSCH fails to be decoded, the terminal feeds back a NACK, to indicate that the data fails to be received. For the first indication information, the terminal may send an ACK, to indicate that the first indication information is successfully received. In other words, the terminal may send two pieces of ACK/NACK information, where one piece of information indicates acknowledgment of the first indication information, and the other piece of information indicates acknowledgment of the data. A sequence of the two pieces of ACK/NACK information is not limited, and may be predefined, or may be configured by the network device.

2. The first acknowledgment information is higher layer signaling.

3. The first acknowledgment information is an uplink sequence or an uplink signal.

For example, the first acknowledgment information may be a preamble sequence, an SRS, or another uplink signal. When receiving the first indication information, the terminal may send an uplink preamble sequence, an SRS, or another uplink signal.

When the network device receives the first acknowledgment information, the network device may determine that the terminal correctly receives the first indication information or the terminal enables or disables some features.

In some implementations, a transmission resource used by the terminal to send the first acknowledgment information may be notified by the network device to the terminal. In this application, the transmission resource includes at least one of a time domain resource, a frequency domain resource, and a code resource (e.g., sequence). Optionally, the code resource (e.g., sequence) may be bound to an identifier of the terminal.

Optionally, the transmission resource may be a common uplink transmission resource, namely, an uplink transmission resource shared by a plurality of terminals. If the terminal sends the first acknowledgment information on the common uplink transmission resource, the terminal may send the identifier of the terminal when sending the first acknowledgment information.

Optionally, the transmission resource may be an uplink transmission resource dedicated to the terminal.

In some implementations, a transmission resource used by the terminal to send the first acknowledgment information may alternatively be indicated by using DCI. For example, the terminal receives the DCI, and transmits the first acknowledgment information on the transmission resource indicated by using the DCI.

The network device recommends or indicates enabling, disabling, or a value of a feature of the terminal. This can better adapt to an environment or service requirement, improve flexibility of enabling the feature, reduce power consumption of the terminal, implement energy saving, and improve communication performance.

If the feature set of the terminal includes a third feature, and the terminal indicates enabling or disabling of the third feature to the network device, or indicates a value of the third feature to the network device, the terminal and the network device may further perform step 206 and step 207, where step 207 is an optional step.

Step 206: The terminal sends second indication information to the network device.

The second indication information indicates the enabling or disabling of the third feature, or indicates the value of the third feature.

The terminal indicates, by using the second indication information, expectation or recommendation of enabling or disabling the third feature, or an expected or recommended value of the third feature.

Optionally, the second indication information includes a second identifier, and the second identifier indicates the second feature.

In some implementations, if the network device indicates enabling, disabling, or a value of a single feature, the second identifier may be an identifier of the second feature.

In some other implementations, the second indication information may further indicate enabling, disabling, or a value of a sixth feature.

For an implementation of the second indication information, refer to descriptions of the first indication information.

Step 207: The network device sends a second acknowledgment information to the terminal.

The second acknowledgment information indicates that the third feature is enabled or disabled, or indicates whether the second indication information is successfully received.

1. The second acknowledgment information is physical layer signaling.

(1) The second acknowledgment information is DCI.

When the network device sends the DCI to schedule uplink data, the network device acknowledges receiving of the second indication information.

Optionally, the network device may indicate, in the DCI, enabling or disabling of the third feature or a value of the third feature, that is, determine to enable or disable the third feature, or determine a value of the third feature.

Optionally, M bits in the DCI may be used to indicate enabling or disabling of the third feature, where M is a positive integer.

Optionally, a quantity of bits in the DCI may depend on a quantity of candidate values of the third feature. For example, the quantity of bits is equal to log 2(N) rounded up, where N is the quantity of candidate values of the third feature.

Optionally, the third feature is enabled or disabled by using one bit in the DCI. For example, if the bit is 0, it indicates to disable the third feature; or if the bit is 1, it indicates to enable the third feature.

(2) The second acknowledgment information is ACK/NACK information.

If the network device sends the ACK, it indicates that the network device correctly receives the second indication information; or if the network device sends the NACK, it indicates that the network device does not correctly receive the second indication information, or that the network device does not allow the terminal to change the third feature, that is, rejects a request of the terminal. Alternatively, a NACK only manner may be used. To be specific, the NACK is fed back only when receiving fails, or no NACK is fed back when receiving succeeds. Alternatively, the NACK is fed back only when a request of the terminal is rejected, or no NACK is fed back when a request of the terminal is allowed.

Optionally, the second acknowledgment information and a data feedback may be sent together. For example, when the terminal sends a data channel, the network device may receive data carried on the data channel (for example, a PUSCH). When the data on the PUSCH is successfully decoded, the network device feeds back an ACK, to indicate that the data is successfully received and the second indication information is successfully received or the network device allows the terminal to change the third feature. When the data on the PUSCH fails to be decoded, the network device feeds back a NACK, to indicate that the data fails to be received and the second indication information fails to be received or the network device does not allow the terminal to change the third feature.

Optionally, the second acknowledgment information and a data feedback may be sent separately. For example, when the terminal sends a data channel, the network device may receive data carried on the data channel (for example, a PUSCH). When the data on the PUSCH is successfully decoded, the network device feeds back an ACK, to indicate that the data is successfully received. For the second indication information, the network device may send an ACK, to indicate that the second indication information is successfully received or the network device allows the terminal to change the third feature. When the data on the PUSCH fails to be decoded, the network device feeds back a NACK, to indicate that the data fails to be received. For the second indication information, the network device may send an ACK, to indicate that the second indication information is successfully received or the network device allows the terminal to change the third feature. In other words, the network device may send two pieces of ACK/NACK information, where one piece of information indicates acknowledgment of the second indication information, and the other piece of information indicates acknowledgment of the data. A sequence of the two pieces of ACK/NACK information is not limited.

2. The second acknowledgment information is higher layer signaling.

When the network device receives the second indication information, the network device may send RRC signaling or MAC layer signaling, to indicate that the terminal successfully receives the second indication information or a request of the terminal is allowed or rejected.

For example, when the request of the terminal is allowed, agree information or complete information may be sent.

For another example, when the request of the terminal is rejected, reject information or release information may be sent.

After receiving the second acknowledgment information, the terminal enables or disables the third feature, or determines the value of the third feature based on the second acknowledgment information.

In some implementations, a transmission resource used by the network device to send the second acknowledgment information may be notified by the network device to the terminal.

The terminal recommends or notifies the network device of enabling, disabling, or a value of a feature of the terminal. This can better adapt to an environment or service requirement, improve flexibility of enabling the feature, reduce power consumption of the terminal, implement energy saving, and improve communication performance. For example, when the terminal does not have a data transmission requirement or has a small-sized data amount, and expects to enter an energy saving mode, the terminal may recommend or notify the network device of disabling of the feature of the terminal, so that the terminal can enter the energy saving mode. This reduces power consumption of the terminal and implements terminal energy saving.

Figure 3:
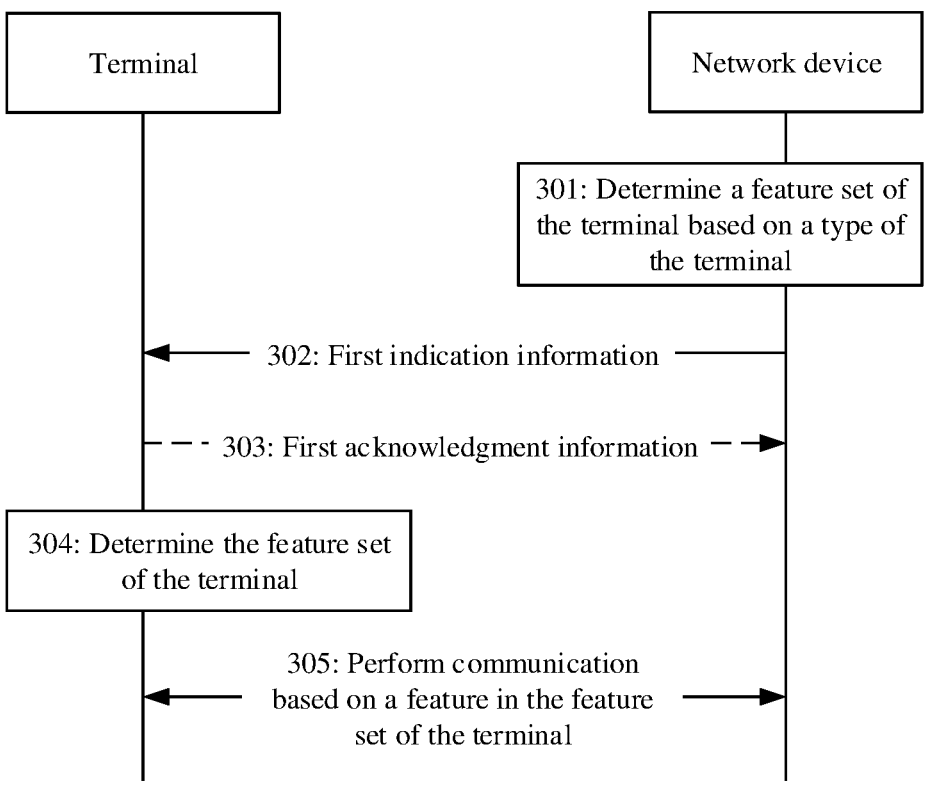
FIG. 3 is an example schematic flowchart of a method for determining a feature of a terminal according to another embodiment of this application.

FIG. 3 is a schematic flowchart of a method for determining a feature of a terminal according to another embodiment of this application.

Different from the method shown in FIG. 2, in the method shown in FIG. 3, a terminal may determine a feature set of the terminal based on an indication of a network device.

Step 301: The network device determines the feature set of the terminal based on a type of the terminal. For detailed descriptions, refer to step 202 in FIG. 2.

Step 302: The network device sends first indication information to the terminal.

Correspondingly, the terminal receives the first indication information sent by the network device.

The first indication information indicates enabling or disabling of a second feature, or indicates a value of a second feature, where the second feature is a feature supported by the terminal.

For detailed descriptions of the first indication information, refer to descriptions of the first indication information in step 204.

Step 303: After receiving the first indication information, the terminal sends first acknowledgment information to the network device. Correspondingly, the network device receives the first acknowledgment information of the terminal. This step is an optional step.

For detailed descriptions of the first acknowledgment information, refer to descriptions of the first acknowledgment information in step 205.

Step 304: The terminal determines the feature set of the terminal based on the first indication information.

For example, the terminal enables or disables the second feature based on the first indication information, or determines the value of the second feature based on the first indication information.

Step 305: The terminal communicates with the network device based on a feature in the feature set of the terminal.

In this solution, the terminal determines the feature set of the terminal based on the indication information of the network device, so that the network device can improve flexibility of the feature set based on a requirement of an environment, a service, or the like, and flexibly enable or disable a feature. This reduces power consumption of the terminal, implements terminal energy saving, and improves communication performance.

Figure 4:
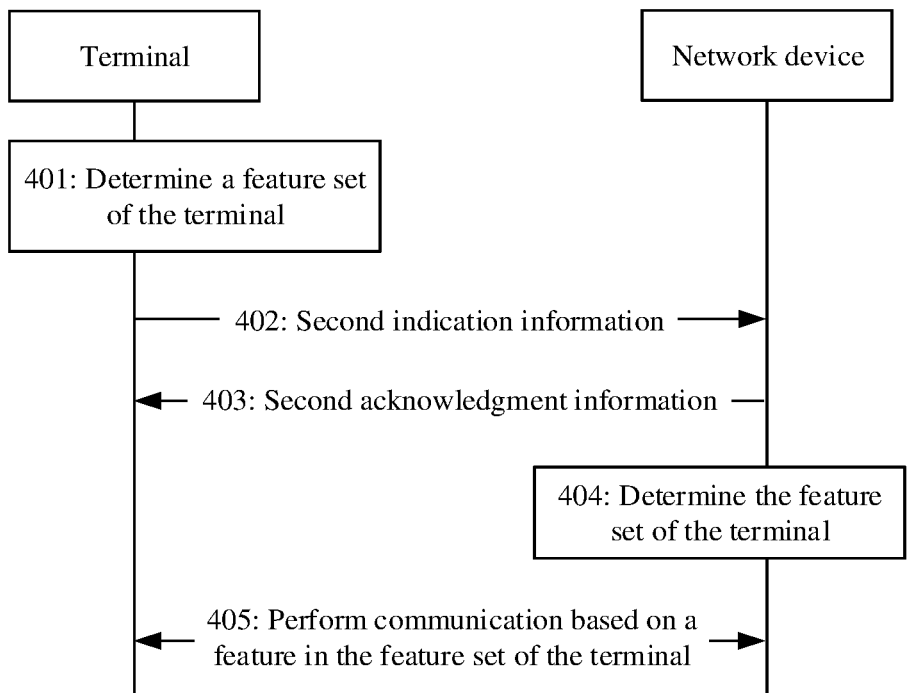
FIG. 4 is an example schematic flowchart of a method for determining a feature of a terminal according to another embodiment of this application.

FIG. 4 is a schematic flowchart of a method for determining a feature of a terminal according to another embodiment of this application.

Different from the methods shown in FIG. 2 and FIG. 3, in the method shown in FIG. 4, a network device determines a feature set of a terminal based on an indication of the terminal.

Step 401: The terminal determines the feature set of the terminal. For detailed descriptions, refer to step 201 in FIG. 2.

Step 402: The terminal sends second indication information to the network device. Correspondingly, the network device receives the second indication information sent by the terminal.

The second indication information indicates enabling or disabling of a third feature, or indicates a value of a third feature, where the third feature is a feature supported by the terminal.

For detailed descriptions of the second indication information, refer to descriptions of the second indication information in step 206.

Step 403: After receiving the second indication information, the network device sends second acknowledgment information to the terminal. Correspondingly, the terminal receives the second acknowledgment information sent by the network device. This step is an optional step.

For detailed descriptions of the second acknowledgment information, refer to descriptions of the second acknowledgment information in step 207.

Step 404: The network device determines the feature set of the terminal based on the second indication information.

For example, the network device enables or disables a second feature based on the second indication information, or determines a value of a second feature based on the second indication information.

Step 405: The terminal communicates with the network device based on a feature in the feature set of the terminal.

In this solution, the network device determines the feature set of the terminal based on the indication information of the terminal, so that the terminal can recommend or notify the network device of enabling or disabling of a feature of the terminal. In this way, the terminal can improve flexibility of the feature set based on a requirement of an environment, a service, or the like, and flexibly enable or disable the feature. This reduces power consumption of the terminal, implements terminal energy saving, and improves communication performance.

It should be noted that the first feature, the second feature, the third feature, the fifth feature, or the sixth feature may include one feature, or may include a plurality of features.

In the method for determining a feature of a terminal provided in this application, there is a correspondence between a feature set of a terminal and a type of a terminal. This can customize and minimize a feature of a terminal, meet feature requirements of different types of terminals, reduce chip costs and terminal implementation processing complexity, and implement terminal energy saving.

The following describes in detail a relationship between a feature set and a type of a terminal in embodiments of this application.

First, features of several common types of terminals are described.

Types of different terminals have at least one of the following different attributes: a supported service type, a mobility requirement, a service data transmission latency requirement, a radio channel environment, a service data transmission reliability requirement, a coverage requirement, and a deployment scenario.

The attribute may further include at least one of the following: a time sensitivity requirement, a location sensitivity requirement, a positioning requirement, another communication requirement, and the like.

Optionally, the service type may be determined based on an amount of service data. For example, the service type may include large-packet data, medium-packet data, small-packet data, and the like. Mobility may include moving and fixed, or may be a movement speed, for example, less than 3 km/h, 30 km/h, or 120 km/h, or may be a speed in a scenario, for example, a walking speed, a vehicle speed, a high-speed railway speed, or an aircraft speed. The moving may further include irregular moving, moving along a fixed route, ultra-short distance moving, or the like. The transmission latency requirement may include a high transmission latency, a low transmission latency, an average transmission latency, and the like. The channel environment may include a variable channel environment, a stable channel environment, a relatively stable channel environment, and the like. The reliability requirement may include high reliability, low reliability, average reliability, and the like. The coverage requirement may include wide coverage, strong coverage, weak coverage, average coverage, deep coverage, and the like. The deployment scenario may include a communication scenario included in the foregoing descriptions of the communication system, or may include uplink communication, downlink communication, uplink and downlink communication, sidelink communication, a transmitting link, a receiving link, full-duplex communication, access communication, backhaul communication, relay communication, or the like. This is not limited.

For example, the type of the terminal includes one or more of the following: an eMBB device, a URLLC device, an IoT device, a CPE device, and a V2X device. The eMBB device is mainly configured to transmit large-packet data or small-packet data. The eMBB device is usually in a moving state. The eMBB device has a general requirement on a transmission latency and reliability. The eMBB device performs both uplink and downlink communication. The eMBB device is in a relatively complex and changeable channel environment in which indoor communication or outdoor communication may be performed. For example, the eMBB device may be a mobile phone. The URLLC device is mainly configured to transmit small-packet data or medium-packet data. The URLLC device is usually in a non-moving state, or may move along a fixed route. The URLLC device has a relatively high requirement on a transmission latency and reliability, that is, requires a low transmission latency and high reliability. The URLLC device performs both uplink and downlink communication. The URLLC device is in a stable channel environment. For example, the URLLC device may be a factory device. The IoT device is mainly configured to transmit small-sized data. The IoT device is usually in a non-moving state with a known location. The IoT device has a medium requirement on a transmission latency and reliability. The IoT device mainly performs uplink communication. The IoT device is in a relatively stable channel environment. For example, the IoT device may be a smart water meter or a sensor. The CPE device is mainly configured to transmit large-packet data. The CPE device is usually in a non-moving state, or may perform ultra-short-distance movement. The CPE device has a medium requirement on a transmission latency and reliability. The CPE device performs both uplink and downlink communication. The CPE device is in a relatively stable channel environment. For example, the CPE device may be a terminal device, an AR terminal, or a VR terminal in a smart home. When a terminal type of a terminal device is determined, the terminal type corresponding to the terminal device may be determined as an eMBB device, a URLLC device, an IoT device, or a CPE device based on a service type, mobility, a transmission latency requirement, a reliability requirement, a channel environment, and a communication scenario of the terminal device.

It should be noted that, the eMBB device may also be described as an eMBB terminal, the URLLC device may also be described as a URLLC terminal, the IoT device may also be described as an IoT terminal, the CPE device may also be described as a CPE terminal, and the V2X device may also be described as a V2X terminal. This is not limited.

It should be noted that the eMBB device may also be referred to as eMBB for short, the URLLC device may also be referred to as URLLC for short, the IoT device may also be referred to as IoT for short, the CPE device may also be referred to as CPE for short, and the V2X device may also be referred to as V2X for short. This is not limited.

Figure 5:
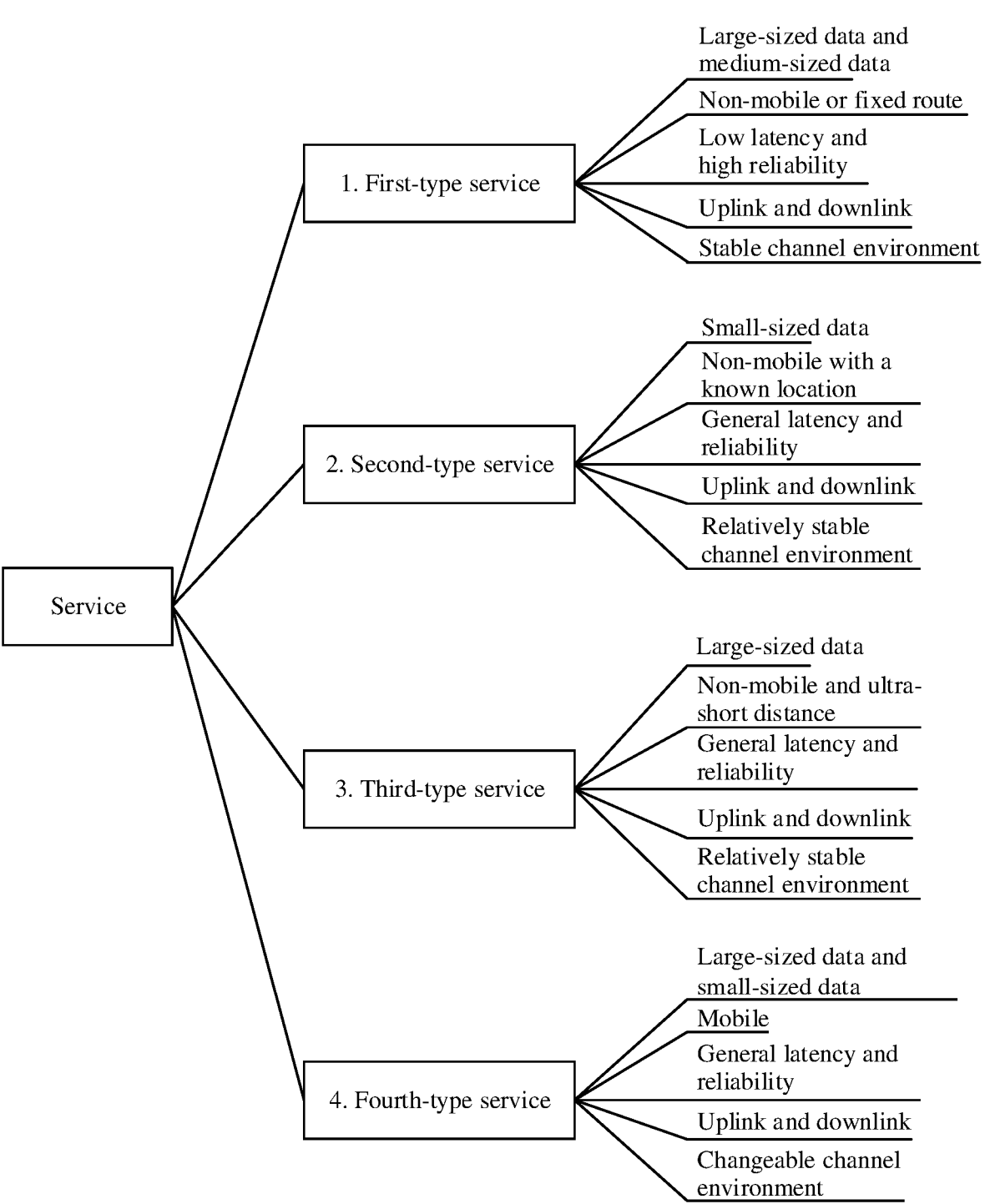
FIG. 5 is an example of analysis of features of different types of terminals.

FIG. 5 is an example of analysis of features of different types of terminals.

1. A first-type terminal may have the following features: The first-type terminal transmits small-sized data and medium data. The terminal is usually non-mobile, or has a fixed route, for example, in a factory scenario. The first-type terminal has a relatively high requirement on a latency and reliability. The first-type terminal performs both uplink and downlink data transmission. The first-type terminal is in a stable channel environment.

For example, the first-type terminal may be a URLLC terminal.

2. A second-type terminal may have the following features: The second-type terminal usually transmits small-sized data, where the data may exist periodically. The second-type terminal is non-mobile with a known location, for example, a smart water meter. The second-type terminal has a general requirement on a latency and reliability. The second-type terminal performs both uplink and downlink data transmission, and mainly performs uplink data transmission. The second-type terminal is in a relatively stable channel environment. The second-type terminal has a relatively high requirement on coverage, for example, a requirement on deep coverage. Some special scenarios are high-speed moving scenarios.

For example, the second-type terminal may be an IoT terminal. The IoT terminal may include one or more of the following: an MTC terminal, an NB-IoT terminal, an mMTC terminal, a sensor, a controller, and the like.

3. A third-type terminal may have the following features: The third-type terminal usually transmits large-sized data. The terminal is fixed and non-mobile, and performs short-distance communication. The third-type terminal has a general requirement on a latency and reliability. The third-type terminal performs both uplink and downlink data transmission. The third-type terminal is in a relatively stable channel environment.

For example, the third-type terminal may be a CPE terminal, a smart home terminal, an AR terminal, or a VR terminal.

4. A fourth-type terminal may have the following features: The fourth-type terminal transmits large-sized data, and occasionally transmits small-sized data. A user (or the terminal) is usually mobile. The fourth-type terminal has a general requirement on a latency and reliability. The fourth-type terminal performs both uplink and downlink data transmission. The fourth-type terminal is in a relatively complex and changeable channel environment, for example, outdoor or indoor.

For example, the fourth-type terminal may be an eMBB terminal.

In this application, a feature set is separately defined for different types of terminals.

The feature set of the terminal may include a first set and a second set.

A feature in the first set is a mandatory feature. The first set is a non-empty set, and is related to the type of the terminal. The first set may also be referred to as a minimum feature set of the terminal.

A feature in the second set belongs to a set including an optional feature. In other words, a feature in the second set is an optional feature. The second set may be an empty set or a non-empty set.

The first set includes at least one of the following: an air interface communication feature, a positioning feature, a sidelink communication feature, a sensing feature, an AI feature, an NTN feature, and the like.

The air interface communication feature may be replaced with a Uu communication feature, and may include at least one of the following: an initial access operation, mobility measurement and feedback, a supported waveform, a supported bandwidth, a modulation scheme, data scheduling, a HARQ operation, a retransmission manner, a terminal processing capability, MIMO, channel measurement and feedback, a frame structure parameter, a channel coding scheme, an uplink power control operation, a resource allocation manner, an uplink control channel, a downlink control channel, carrier aggregation, dual connectivity, a bandwidth part (bandwidth part, BWP), a supplementary uplink (SUL), another feature in the air interface communication feature, and the like.

The positioning feature may include at least one of the following: a positioning feature based on a DL AOD, a positioning feature based on a DL-TDOA, a bandwidth size of a positioning reference signal, a quantity of downlink positioning reference signal resources, support of sending a periodic SRS used for positioning, and the like.

The sidelink communication feature may include a basic sidelink communication capability.

The sensing feature may be a function or feature of having a sense or awareness of a channel environment, a location, a scenario, or the like. The sensing feature may alternatively be unified with the positioning feature, for example, may be a sensing and positioning integrated function/feature. The sensing feature may alternatively be unified with the communication feature, for example, may be a sensing and communication integrated function/feature. A sensing network may mean that a communication device/communication network can sense an existing network environment, and investigate configuration of the communication network in real time based on understanding of the environment, to intelligently adapt to a change of the professional environment.

For example, the sensing feature may include at least one of the following: sending a perception reference signal, receiving a perception reference signal, and analyzing a learned decision.

For example, the sensing feature may be a feature of sending and/or receiving a sensing reference signal. The communication device may have an ability to learn from a change, and use the ability in a future decision. Learning and application capabilities are established based on real-time sensing of a network environment.

The AI feature may be a function or feature of artificial intelligence, to implement an algorithm, an operation, processing, or the like of artificial intelligence. During communication, a communication device may improve communication performance by using the AI feature.

For example, the AI feature may include at least one of the following: AI based channel estimation, AI based channel measurement and feedback, AI based encoding/decoding, AI based modulation/demodulation, an AI based transmitter, an AI based receiver, AI based data scheduling, AI based power control, AI based resource management, AI based link management, AI based network security, AI based network optimization, an AI based network architecture, AI based physical layer communication, and the like.

The NTN feature may be a function or feature of performing communication in a non-terrestrial network, for example, a low-altitude network, a high-altitude network, a satellite network, or an unmanned aerial vehicle network. The NTN feature may alternatively be unified with ground communication, for example, may be a space-air-ground integrated network or a space-air-ground integrated function/feature. A device in the NTN network may include at least one of the following non-terrestrial devices: a low-orbit satellite, a high-orbit satellite, a synchronous satellite, an unmanned aerial vehicle, an aircraft, and the like. For example, that a network device has the NTN feature may mean that the network device has a feature of communicating with a non-terrestrial device. Communication may be sending a signal and/or receiving a signal. For example, the network device has a capability of communicating with a satellite, to be specific, may receive a signal from the satellite and/or send a signal to the satellite.

In this application, a first set is separately defined for different types of terminals.

Optionally, a first set is related to a type of a terminal. In other words, there is a correspondence between a first set and a type of a terminal.

Optionally, the correspondence between a first set and a type of a terminal may be predefined in a protocol, or may be notified by the network device to the terminal by using signaling. The signaling may be higher layer signaling or physical layer signaling.

The type of the terminal may include at least one of the following: a first type, a second type, a third type, a fourth type, and the like.

The first set may include at least one of the following: a feature 1, a feature 2, a feature 3, a feature 4, and the like.

For example, a first set of a first-type terminal includes a feature 1; a first set of a second-type terminal includes a feature 2; a first set of a third-type terminal includes a feature 3; and a first set of a fourth-type terminal includes a feature 4. The following provides an example for description.

(1) If the type of the terminal is the first type, the first set may include a positioning feature and a sidelink communication feature.

An example in which the first-type terminal is a URLLC terminal is used for description. In a URLLC scenario, the URLLC terminal may be a mechanical arm, a robot, or the like that moves. To align a beam of the mechanical arm or the like and reduce a latency caused by beam switching or cell handover, the positioning feature is used as a mandatory feature of the URLLC terminal in this application. A location may be predicted and prepared in advance by using the positioning feature. This can meet a precise operation requirement, implement a latency of 0 ms, and avoid service interruption. In addition, considering that communication needs to be performed between URLLC terminals (for example, devices in a factory) in a URLLC scenario, the sidelink communication feature is used as a mandatory feature of the URLLC terminal in this application. This can meet a service requirement on a low latency and high reliability.

Optionally, the first set may further include an air interface communication feature.

(2) If the type of the terminal is the second type, the first set includes a sensing feature and a non-terrestrial network NTN communication feature.

An example in which the second-type terminal is an IoT terminal is used for description. First, the sensing feature is used as a mandatory feature of the IoT terminal, so that the IoT terminal can sense a surrounding environment. This helps reduce power consumption and improve communication performance. In addition, the NTN feature is used as a mandatory feature of the IoT terminal. This helps improve coverage in special scenarios (such as deserts and oceans) and improve communication performance.

Optionally, the first set may further include an air interface communication feature.

(3) If the type of the terminal is the third type, the first set includes an AI feature.

An example in which the third-type terminal is CPE is used for description. For CPE with a strong capability, communication performance can be improved based on the AI feature. For example, channel state information (CSI) obtaining, channel estimation, encoding and decoding, an AI receiver, and an AI transmitter are implemented based on AI.

Optionally, the first set may further include an air interface communication feature.

(4) If the type of the terminal is the fourth type, the first set includes an air interface communication feature. For example, the fourth-type terminal may be eMBB.

The following describes in detail some features in the air interface communication feature. The following feature embodiments may be independent of each other, or may be combined with each other. This is not limited in this application.

(1) Initial Access Operation and Mobility Measurement and Feedback

The initial access operation and the mobility measurement and feedback may also be described together as an initial access and mobility feature. The initial access and mobility feature may alternatively be two separate features, such as an initial access feature and a mobility feature. For ease of description, the following provides descriptions by using the initial access and mobility feature.

The initial access and mobility feature may include one or more of the following: a basic initial access channel and operation, synchronization signal and physical broadcast channel block (SSB) based signal to interference plus noise ratio (SINR) measurement (SSB based SINR measurement), SSB based radio link management (RLM) (SSB based RLM), SSB based radio resource management (RRM) (SSB based RRM), CSI-RS based SINR measurement, CSI-RS based RRM, CSI-RS based RLM, cell handover, neighborhood-cell measurement, and the like.

Considering that different types of terminals have different features, different types of terminals may support different initial access and mobility features. The terminal may support a part or all of the initial access and mobility feature. This customizes a minimum feature set of the terminal, reduces chip costs of the terminal, implements terminal energy saving, and improves communication performance.

For example, the first set of the first-type terminal may include a basic initial access channel and operation, SSB based RLM, CSI-RS based SINR measurement, and CSI-RS based RRM. For example, the first-type terminal may be a URLLC terminal. Considering that the terminal may be at a fixed location, or may regularly move along a fixed route, the first set of the terminal includes the RLM, the RRM, the SINR measurement, and the like. This can better adapt to a change of a mobile communication environment, perform mobility management in a timely manner, and improve communication performance.

For example, the first set of the second-type terminal may include a basic initial access channel and operation. For example, the second-type terminal may be an IoT terminal. Considering that the second-type terminal may be at a fixed location, the terminal with the fixed location may not need to support features such as cell handover and neighboring cell measurement. This can reduce terminal implementation complexity and terminal power consumption.

For example, the first set of the third-type terminal may include a basic initial access channel and operation and CSI-RS based SINR measurement. For example, the third-type terminal may be a CPE terminal. Considering that the third-type terminal is at a fixed location, usually transmits large-sized data, needs to perform high-rate transmission, and does not have beam management, the terminal may not need to support features such as cell handover and neighboring cell measurement. This can reduce terminal implementation complexity and terminal power consumption.

For example, the first set of the fourth-type terminal may include a basic initial access channel and operation, SSB based RLM, CSI-RS based RRM, cell handover, and neighboring cell measurement. For example, the fourth-type terminal may be an eMBB terminal. Considering that the terminal may be at a fixed location, or may be mobile, the first set of the terminal includes the RLM, the RRM, the SINR measurement, the cell handover, and the like. This can better adapt to a change of a mobile communication environment, perform mobility management in a timely manner, and improve communication performance.

(2) Supported Waveform

In an NR system, for downlink data transmission, the first set of the terminal includes an OFDM waveform; and for uplink data transmission, the first set of the terminal includes an OFDM waveform and a DFT-S-OFDM waveform.

In this application, considering that different types of terminals have different features, different types of terminals may support different waveforms. This customizes a minimum feature set of the terminal, reduces chip costs of the terminal, implements terminal energy saving, and improves communication performance.

For example, the first set of the first-type terminal may include an OFDM waveform. The OFDM waveform may be used for uplink transmission or downlink transmission. For example, the first-type terminal may be a URLLC terminal.

For example, the first set of the second-type terminal may include a low-cost waveform. The low-cost waveform may include a weighted overlap and add-orthogonal frequency division multiplexing (WOLA-OFDM) waveform, a filter bank based multicarrier-offset quadrature amplitude modulation (FBMC-OQAM) waveform, a generalized frequency division multiplexing (GFDM) waveform, a cross phase modulation (CPM) waveform, and another low-cost waveform. For example, the second-type terminal may be an IoT terminal. To reduce costs, the first set of the second-type terminal includes the low-cost waveform, that is, the second-type terminal may support communication only in the low-cost waveform. This reduces terminal costs, and improves communication performance.

For example, the first set of the third-type terminal may include an OFDM waveform. For example, the third-type terminal may be a CPE terminal.

For example, the first set of the fourth-type terminal includes a downlink OFDM waveform, an uplink OFDM waveform, and an uplink DFT-S-OFDM waveform. That is, both peak to average power ratio (PAPR) performance and communication performance of this type of terminal are considered. For example, the fourth-type terminal may be an eMBB terminal.

(3) Supported Bandwidth

In the NR system, various bandwidths are defined for data transmission. For different frequency bands, different types of terminals support a same bandwidth.

In this application, considering that different types of terminals have different features, different types of terminals may support different bandwidths. This customizes a minimum feature set of the terminal, reduces chip costs of the terminal, implements terminal energy saving, and improves communication performance.

For example, the first set of the first-type terminal may include at least one of 20 MHz, 40 MHz, 100 MHz, 200 MHz, and 400 MHz. For example, the first-type terminal may be a URLLC terminal.

For example, the first set of the second-type terminal includes an ultra-narrow bandwidth. The ultra-narrow bandwidth may be at least one of 1.08 MHz, 3 MHz, 5 MHz, 10 MHz, or another ultra-narrow bandwidth value. For example, the second-type terminal may be an IoT terminal. To reduce costs, the first set of the second-type terminal includes the ultra-narrow bandwidth, that is, the second-type terminal supports communication only in the ultra-narrow bandwidth. This reduces terminal costs, and improves communication performance.

For example, the first set of the third-type terminal may include at least one of 20 MHz, 40 MHz, 100 MHz, 200 MHz, 400 MHz, and an ultra-wide bandwidth. The ultra-wide bandwidth may be at least one of 500 MHz, 800 MHz, 1 GHz, 2 GHz, and the like. For example, the third-type terminal may be a CPE terminal. To implement high-speed data transmission, the first set of the third-type terminal includes the ultra-wide bandwidth. This implements high-speed transmission, and improves communication performance.

For example, the first set of the fourth-type terminal includes at least one of 20 MHz, 40 MHz, 100 MHz, 200 MHz, and 400 MHz. For example, the fourth-type terminal may be an eMBB terminal.

(4) Modulation Scheme

In the NR system, various modulation schemes are defined for data transmission. The modulation scheme may also be referred to as a modulation order. Different types of terminals support a same modulation scheme, or feature sets of different types of terminals include a same modulation scheme.

The modulation scheme included in the feature set of the terminal or the modulation scheme supported by the terminal may be a supported highest-order modulation scheme.

In this application, considering that different types of terminals have different features, different types of terminals may support different modulation schemes. This customizes a minimum feature set of the terminal, reduces chip costs of the terminal, implements terminal energy saving, and improves communication performance.

For example, the first set of the first-type terminal may include 64QAM. For example, the first-type terminal may be a URLLC terminal.

For example, the first set of the second-type terminal may include at least one of ½ binary phase shift keying (BPSK), QPSK, and 16QAM. For example, the second-type terminal may be an IoT terminal. To reduce costs, the first set of the second-type terminal includes a low-order modulation scheme, that is, the second-type terminal supports ½ BPSK, QPSK, and 16QAM. This reduces terminal costs, and improves communication performance.

For example, the first set of the third-type terminal may include at least one of 256QAM, 1024QAM, and a higher-order modulation scheme. For example, the third-type terminal may be a CPE terminal. To implement high-speed data transmission, the first set of the third-type terminal includes at least one of the 256QAM, the 1024QAM, the higher-order modulation scheme, and the like. This implements high-speed transmission, and improves communication performance.

For example, the first set of the fourth-type terminal includes 64QAM. For example, the fourth-type terminal may be an eMBB terminal.

The foregoing (1), (2), (3), and (4) may be combined with each other. Different types of terminals have different requirements on data transmission. Therefore, a more suitable feature set may be determined and/or used. This customizes a minimum feature set of the terminal, reduces chip costs of the terminal, implements terminal energy saving, and improves communication performance.

For example, one type of terminal may correspond to one feature set, and the feature set may include one or more in the initial access and mobility feature, support one or more waveforms, support one or more bandwidths, and support one or more modulation schemes.

For example, the first set of the first-type terminal may include a basic initial access channel and operation, SSB based RRM, CSI-RS based RRM, CSI-RS based SINR measurement, an OFDM waveform, an ultra-narrow bandwidth and/or 20 MHz, and 16QAM and/or QPSK. For example, the first-type terminal may be a URLLC terminal.

For example, the first set of the second-type terminal may include a basic initial access channel and operation, SSB based SINR measurement, a low-cost waveform, an ultra-narrow bandwidth and/or 20 MHz, and 16QAM and/or QPSK. For example, the second-type terminal may be an IoT terminal.

For example, the first set of the third-type terminal may include a basic initial access channel and operation, SSB based SINR measurement, an OFDM waveform, an ultra-wide narrow bandwidth and/or 100 MHz, and 256QAM and/or 1024QAM. For example, the third-type terminal may be a CPE terminal.

For example, the first set of the fourth-type terminal may include a basic initial access channel and operation, SSB based RRM, CSI-RS based RRM, cell handover, neighboring cell measurement, an OFDM waveform, a DFT-S-OFDM waveform, 20 MHz, 40 MHz, 100 MHz, and 64QAM. For example, the fourth-type terminal may be an eMBB terminal.

In the foregoing embodiment, customization of a terminal capability set is designed. A terminal capability/feature is customized based on the type of the UE, so that the feature matches the type of the terminal. This meets various device requirements, reduces communication complexity, reduces chip costs, and reduces power consumption.

(5) Scheduling Manner

The scheduling manner may include one or more of the following: dynamic scheduling, a configured grant type 1, a configured grant type 2, SPS, slot/sub-slot aggregation, cross-slot scheduling, and including of data in a message 1 or a message 3 in a random access channel (RACH) process.

The scheduling manner may further include a data transmission manner and/or a resource allocation manner. For example, the data transmission manner may include repeated transmission. For example, the resource allocation manner may include intra-slot frequency hopping, inter-slot frequency hopping, and disabled frequency hopping.

Dynamic scheduling: Data transmission based on dynamic scheduling is data transmission scheduled based on physical layer signaling (for example, DCI).

Slot/sub-slot aggregation: For data transmission based on slot/sub-slot aggregation, one data transmission may occupy one or more slots, or may occupy one or more sub-slots. A quantity of slots or sub-slots may be indicated by using an aggregation factor. Indication performed by using the aggregation factor may be indication performed by using higher layer signaling or physical layer signaling.

Data in a plurality of slots or sub-slots may be same data of different redundancy versions. A bit rate can be reduced through data transmission in this manner and a diversity gain is obtained through a plurality of repeated transmissions. This improves data transmission reliability. Data transmission based on slot/sub-slot aggregation can implement a plurality of fast data transmission of the terminal, reduce DCI signaling overheads, and reduce a transmission latency. For example, the terminal may perform, by using one piece of DCI, data transmission in a plurality of slots or sub-slots, to implement a plurality of fast and efficient data transmissions, reduce DCI overheads, and reduce a transmission latency. This is applicable to a terminal of a service type having a high reliability requirement.

Data in a plurality of slots or sub-slots may alternatively be different data. Data transmission in this manner can implement fast large-packet transmission, reduce DCI overheads, reduce a transmission latency, and improve a data transmission capacity. Data transmission based on slot/sub-slot aggregation can implement fast large-packet data transmission of the terminal, reduce DCI signaling overheads, and reduce a transmission latency. For example, the terminal may perform, by using one piece of DCI, data transmission in a plurality of slots or sub-slots, to implement fast and efficient transmission of a large-sized data packet, reduce DCI overheads, and reduce a transmission latency. This is applicable to a terminal of a service type of large-packet data.

Cross-slot scheduling: For data transmission based on cross-slot scheduling, a slot in which physical layer signaling (for example, DCI) is located is different from a slot in which data is located. For data transmission based on cross-slot scheduling, a subsequent slot may be reserved when there is no resource in the current slot, so that a latency is reduced, and data receiving and sending is prepared in advance.

Including of data in a message 1 or a message 3 in a random access process: When sending a preamble sequence of a RACH, the terminal may transmit data on a corresponding time-frequency resource, to avoid scheduling of physical layer signaling (for example, DCI); or transmit data in the message 3 based on scheduling of a random access response (RAR) in a random access process. The data is included in the message 1 or the message 3 in the random access process, so that the data of the terminal can be quickly sent, a transmission latency can be reduced, and transmission efficiency can be improved.

Repeated transmission: The repeated transmission may mean that data is repeatedly transmitted for a plurality of times.

Intra-slot frequency hopping: The intra-slot frequency hopping may mean that frequency domain resources for data transmission are different on different symbols in a slot.

Inter-slot frequency hopping: The inter-slot frequency hopping may mean that frequency domain resources for data transmission are different in different slots.

Different types of terminals may have different data transmission requirements. Therefore, the terminal and/or the network device may determine and/or use a more suitable scheduling manner based on the type of the terminal. That is, when the feature set of the terminal is defined, the type of the terminal may be considered. This customizes a minimum feature set of the terminal, reduces chip costs of the terminal, implements terminal energy saving, and improves communication performance.

For example, one type of terminal may correspond to one feature set, and the feature set may include one or more scheduling manners. The scheduling manner may be at least one of the foregoing scheduling manners, or may be another scheduling manner.

For example, a first set of a type-1 terminal includes scheduling manners A1, A2, and A3. A first set of a type-2 terminal includes scheduling manners B1 and B2. A first set of a type-X terminal includes scheduling manners X1 and X2. A terminal type 1, a terminal type 2, . . . , and a terminal type X may be at least one of the foregoing terminal types, such as eMBB, URLLC, IoT, CPE, V2X, and AR/VR. This is not limited. The scheduling manner A1, the scheduling manner A2, the scheduling manner A3, the scheduling manner B1, the scheduling manner B2, the scheduling manner X1, and the scheduling manner X2 each may be at least one of the foregoing scheduling manners, such as dynamic scheduling, configured grant type scheduling, SPS scheduling, slot or sub-slot aggregation, cross-slot scheduling, and including of data during random access. This is not limited.

In the conventional technology, the eMBB terminal needs to support data transmission based on dynamic scheduling, and data transmission based on configured grant scheduling and data transmission based on slot aggregation are optional.

In this application, the terminal and/or the network device may determine and/or use a more suitable scheduling manner based on the type of the terminal.

For example, a scheduling manner in the first set of the first-type terminal includes a configured grant scheduling manner and a slot/sub-slot aggregation scheduling manner. For example, the first-type terminal may be a URLLC terminal. Considering that the first-type terminal performs low-latency and high-reliability service transmission of small-sized data or medium data, dynamic scheduling may not be performed. Instead, transmission may be directly performed in the configured grant scheduling manner, and an incoming packet may be transmitted at any time, so that a latency can be reduced. A plurality of repeated transmissions may be performed in the slot aggregation scheduling manner, so that reliability is improved, and a latency caused by first feedback and then retransmission is reduced.

For example, a scheduling manner in the first set of the second-type terminal includes dynamic scheduling. For example, the second-type terminal may be an IoT terminal. Considering that the second-type terminal performs regular service transmission of small-sized data, the dynamic scheduling manner may be used.

For example, a scheduling manner in the first set of the third-type terminal includes a dynamic scheduling manner and a slot/sub-slot aggregation scheduling manner. For example, the third-type terminal may be a CPE terminal. Considering that a feature of the third-type terminal is static and large-sized data transmission, a high power consumption mode may be used, and data is transmitted at all moments. Therefore, large-sized data transmission may be performed in a plurality of slots in a scheduling manner such as dynamic scheduling, cross-slot scheduling, or slot aggregation, to improve a transmission rate.

For example, a scheduling manner in the first set of the fourth-type terminal includes dynamic scheduling. For example, the fourth-type terminal may be an eMBB terminal.

In this application, optionally, there is a correspondence between a type of a terminal and a scheduling manner. The correspondence may be predefined in a protocol, or may be notified by the network device to the terminal by using signaling, for example, by using higher layer signaling or physical layer signaling.

Table 6 shows an example of a correspondence between a type of a terminal and a scheduling manner.

TABLE 6

| Type of a terminal | Scheduling manner |
|---|---|
| Type 1 | Scheduling manners A1, A2, . . . , and An |
| Type 2 | Scheduling manners B1, B2, . . . , and Bn |
| . . . | . . . |
| Type X | Scheduling manners X1, X2, . . . , and Xn |

The type 1 to the type X of the terminals each may be one of the foregoing types, such as an eMBB terminal, a URLLC terminal, an IoT terminal, CPE, a V2X terminal, an AR terminal, and a VR terminal. The scheduling manners A1 to An, B1 to Bn, and X1 to Xn each may be at least one of the foregoing scheduling manners, such as dynamic scheduling, configured grant, SPS, slot/sub-slot aggregation, cross-slot scheduling, and including of data in a message 1 or a message 3 in a random access process. An, Bn, . . . , and Xn are positive integers, and may have a same value or different values.

Table 7 shows an example of a correspondence between a type of a terminal and a scheduling manner. The correspondence between a type of a terminal and a scheduling manner may be at least one row and/or at least one column in the following table.

TABLE 7

| Type of a terminal | Scheduling manner |
|---|---|
| First-type terminal (for example, URLLC terminal) | Configured grant, slot/sub-slot aggregation, and SPS |
| Second-type terminal (for example, IoT terminal) | Dynamic scheduling and slot/sub-slot aggregation |
| Third-type terminal (for example, CPE terminal) | Including of data in a message 1 or a message 3 in a random access process |
| Fourth-type terminal (for example, eMBB terminal) | Dynamic scheduling and/or cross-slot scheduling |

In this application, the scheduling manner may be a scheduling manner in which the terminal receives data, for example, a downlink scheduling manner, or may be a scheduling manner in which the terminal sends data, for example, an uplink scheduling manner.

In some implementations, for receiving data by the terminal and sending data by the terminal, the terminal and/or the network device may separately determine and/or define a scheduling manner based on the type of the terminal. In this way, the first set of the terminal includes a scheduling manner in which the terminal receives data and/or a scheduling manner in which the terminal sends data.

For example, in a first set 1 of the type-1 terminal, an uplink scheduling manner is A1' and/or a downlink scheduling manner is A1*; and/or in a first set 2 of the type-1 terminal, an uplink scheduling manner is A2' and/or a downlink scheduling manner is A2*.

For example, in a first set 1 of the type-2 terminal, an uplink scheduling manner is Br and/or a downlink scheduling manner is B1*; and/or in a first set 2 of the type-2 terminal, an uplink scheduling manner is B2' and/or a downlink scheduling manner is B2*.

For example, in a first set 1 of the type-X terminal, an uplink scheduling manner is X1' and/or a downlink scheduling manner is X1*; and/or in a first set 2 of the type-X terminal, an uplink scheduling manner is X2' and/or a downlink scheduling manner is X2*.

Optionally, there is a correspondence between a type of a terminal and a scheduling manner in which a terminal receives data. There is a correspondence between a type of a terminal and a scheduling manner in which a terminal sends data. The correspondence may be predefined in a protocol, or may be notified by the network device to the terminal by using signaling, for example, by using higher layer signaling or physical layer signaling.

Table 8 is another example of a correspondence between a type of a terminal and a scheduling manner.

TABLE 8

| Type of a terminal | Scheduling manner |
|---|---|
| Type 1 | Uplink scheduling manner A1', A2', . . . , and An', and/or downlink scheduling manner A1*, A2*, . . . , and An* |
| Type 2 | Uplink scheduling manner B1', B2', . . . , and Bn', and/or downlink scheduling manner B1*, B2*, . . . , and Bn* |
| . . . | . . . |
| Type X | Uplink scheduling manner X1', X2', . . . , and Xn', and/or downlink scheduling manner X1*, X2*, . . . , and Xn* |

The type 1 to the type X of the terminals each may be one of the foregoing types, such as an eMBB terminal, a URLLC terminal, an IoT terminal, CPE, a V2X terminal, an AR terminal, and a VR terminal. The uplink scheduling manners A1' to An', B1' to Bn', and X1' to Xn', and the downlink scheduling manners A1* to An*, B1* to Bn*, and X1* to Xn* each may be at least one of the foregoing scheduling manners, such as dynamic scheduling, configured grant, SPS, slot/sub-slot aggregation, cross-slot scheduling, and including of data in a message 1 or a message 3 in a random access process. An', Bn', Xn', An*, Bn*, and Xn* are positive integers, and may have a same value or different values.

(6) HARQ Operation

The HARQ operation may also be referred to as ACK/NACK feedback or a HARQ manner, and may include one or more of the following: no ACK/NACK feedback, code-word-level ACK/NACK feedback, code block group-level ACK/NACK feedback, synchronous HARQ, asynchronous HARQ, adaptive HARQ, and non-adaptive HARQ.

No ACK/NACK feedback: After data is received or sent, the terminal does not need to feed back an ACK/a NACK. In this manner, data may be transmitted in a blind retransmission manner. This reduces a latency, reduces uplink feedback overheads, and improves communication performance.

Codeword-level ACK/NACK feedback: To be specific, a granularity of data feedback is a codeword. For example, if a codeword is correctly transmitted, an ACK is fed back; or if a codeword is incorrectly transmitted, a NACK is fed back. A codeword may also be referred to as a transport block (TB).

Code block group-level ACK/NACK feedback: To be specific, a granularity of data feedback is a code block group. Compared with the codeword-level feedback, the code block group-level feedback can implement feedback at a smaller granularity.

Because one TB is divided into a plurality of code blocks (CBs), the terminal may know whether each CB is correct during decoding. Therefore, one manner is to perform ACK/NACK feedback on each CB. In this way, if a TB fails to be decoded, the terminal only needs to retransmit a CB that is incorrectly transmitted, and does not need to retransmit the entire TB. The CB-based feedback seems to reduce retransmitted redundant information, and can improve resource utilization. However, a large quantity of uplink ACKs/NACKs need to be fed back, resulting in excessively high overheads of uplink signaling. In addition, because it is meaningless to feed back a large quantity of ACKs, resources are wasted. A compromise solution of TB-based feedback and CB-based feedback is introduced in NR. A plurality of CBs in a TB are grouped, and the grouped CBs are referred to as code block groups (CBGs). One codeword may include one or more code blocks. A corresponding ACK/NACK is fed back for each CBG, and retransmission is performed based on the CBG. For example, one codeword includes a code block group 1 and a code block group 2. If the code block group 1 is correctly transmitted, an ACK is fed back; or if the code block group 1 is incorrectly transmitted, a NACK is fed back. If the code block group 2 is correctly transmitted, an ACK is fed back; or if the code block group 2 is incorrectly transmitted, a NACK is fed back. A maximum quantity of CBGs may be 2, 4, 6, 8, or the like. A corresponding ACK/NACK is fed back for each CBG, and retransmission is performed based on the CBG. CBG transmission is configurable, and only a user configured with CBG-based transmission can perform retransmission based on the CBG. A corresponding ACK/NACK is fed back for each CBG, so that resource utilization can be improved, and retransmission of redundant information can be avoided. In addition, a waste of resources caused by excessively large uplink feedback signaling can be avoided.

In time domain, the HARQ is classified into synchronous HARQ and asynchronous HARQ. In frequency domain, the HARQ is classified into adaptive HARQ and non-adaptive HARQ. During a same HARQ process, only one TB can be processed at a same transmission time interval.

Synchronous HARQ: The synchronous HARQ means that retransmission can be performed only at a fixed moment after previous transmission, and means that only a specific HARQ process can be used for a specific subframe. An advantage of the synchronous HARQ is that a HARQ process number can be derived directly from a system frame number/subframe number without explicitly sending the HARQ process number.

Asynchronous HARQ: The asynchronous HARQ means that retransmission may occur at any time, and means that a HARQ process can be used in any order. An advantage of the asynchronous HARQ is that retransmission scheduling is more flexible.

Adaptive HARQ: A PRB resource and a modulation and coding scheme (MCS) used for retransmission can be changed.

Non-adaptive HARQ: A PRB resource and an MCS used for retransmission need to be the same as those used for previous transmission (new transmission or previous retransmission).

Asynchronous HARQ/synchronous HARQ and adaptive HARQ/non-adaptive HARQ are all related to a relationship between previous transmission (including new transmission and previous retransmission) and retransmission.

Different types of terminals may have different requirements on data transmission. Therefore, the terminal and/or the network device may determine and/or use a more suitable HARQ operation based on the type of the terminal. This customizes a minimum feature set of the terminal, reduces chip costs of the terminal, implements terminal energy saving, and improves communication performance.

For example, one type of terminal may correspond to one feature set, and the feature set may include one or more HARQ manners. The HARQ manner may be at least one of the foregoing HARQ manners, or may be another HARQ manner.

For example, the first set of the type-1 terminal includes HARQ manners a1 and a2. The first set of the type-2 terminal includes HARQ manners b1 and b2. The first set of the type-X terminal includes HARQ manners x1 and x2. A terminal type 1, a terminal type 2, . . . , and a terminal type X may be at least one of the foregoing terminal types, such as eMBB, URLLC, IoT, CPE, V2X, and AR/VR. This is not limited. The HARQ manner a1, the HARQ manner a2, the HARQ manner b1, the HARQ manner b2, the HARQ manner x1, and the HARQ manner x2 each may be at least one of the foregoing HARQ manners, such as no ACK/NACK feedback, codeword-level ACK/NACK feedback, code block group-level ACK/NACK feedback, synchronous HARQ, asynchronous HARQ, adaptive HARQ, and non-adaptive HARQ. This is not limited.

In this application, the terminal and/or the network device may determine and/or use a more suitable HARQ manner based on the type of the terminal.

For example, the first set of the first-type terminal includes no ACK/NACK feedback and/or includes codeword-level ACK/NACK feedback. For example, the first-type terminal may be a URLLC terminal. Considering that the first-type terminal may perform low-latency and high-reliability service transmission of small-sized data or medium data, ACK/NACK feedback may not be performed. Instead, a plurality of retransmissions may be directly performed, so that a latency can be reduced. In a scenario in which small-sized data is transmitted, codeword-level ACK/NACK feedback may alternatively be performed.

For example, the first set of the second-type terminal includes no ACK/NACK feedback. For example, the second-type terminal may be an IoT terminal. Considering that the second-type terminal may perform regular service transmission of small-sized data, no ACK/NACK feedback may be performed. This reduces a latency and feedback overheads, implements terminal energy saving, and reduces terminal costs.

For example, the first set of the third-type terminal includes codeword-level ACK/NACK feedback and CBG-level ACK/NACK feedback. For example, the third-type terminal may be a CPE terminal. Considering that a feature of the third-type terminal may be static and large-sized data transmission, codeword-level ACK/NACK feedback or CBG-level ACK/NACK feedback may be used. This avoids repeated transmission of a redundant and correct CBG, and improves transmission efficiency.

For example, the first set of the fourth-type terminal includes codeword-level ACK/NACK feedback. For example, the fourth-type terminal may be an eMBB terminal.

In this application, optionally, there is a correspondence between a type of a terminal and a HARQ operation. The correspondence may be predefined in a protocol, or may be notified by a base station or a core network to the terminal by using signaling, for example, by using higher layer signaling or physical layer signaling.

Table 9 shows an example of a correspondence between a type of a terminal and a HARQ operation.

TABLE 9

| Type of a terminal | HARQ operation |
|---|---|
| Type 1 | HARQ operations a1, a2, . . . , and an |
| Type 2 | HARQ operations b1, b2, . . . , and bn |
| . . . | . . . |
| Type X | HARQ operations x1, x2, . . . , and xn |

The type 1 to the type X of the terminals each may be one of the foregoing types, such as an eMBB terminal, a URLLC terminal, an IoT terminal, CPE, a V2X terminal, an AR terminal, and a VR terminal. The HARQ operations a1 to an, b1 to bn, and x1 to xn may be at least one of the foregoing HARQ operations, such as no ACK/NACK feedback, codeword-level ACK/NACK feedback, code block group-level ACK/NACK feedback, synchronous HARQ, asynchronous HARQ, adaptive HARQ, and non-adaptive HARQ. an, bn, . . . , and xn are positive integers, and may have a same value or different values.

Table 10 shows an example of a correspondence between a type of a terminal and a HARQ operation. The correspondence between a type of a terminal and a HARQ operation may be at least one row and/or at least one column in the following table.

TABLE 10

| Type of a terminal | HARQ operation |
|---|---|
| First type (for example, URLLC terminal) | Codeword-level ACK/NACK feedback and/or no ACK/NACK feedback |
| Second type (for example, IoT terminal) | No codeword-level ACK/NACK feedback |
| Third type (for example, CPE terminal) | CBG-level ACK/NACK feedback |
| Fourth type (for example, eMBB terminal) | Codeword-level ACK/NACK feedback and/or asynchronous HARQ |

In this application, the HARQ operation may be a HARQ operation in which the terminal receives data, for example, a downlink HARQ operation, or may be a HARQ operation in which the terminal sends data, for example, an uplink HARQ operation.

In some implementations, for receiving data by the terminal and sending data by the terminal, the terminal and/or the network device may separately determine and/or define a HARQ operation based on the type of the terminal. In this way, the first set of the terminal includes a HARQ operation in which the terminal receives data and/or a HARQ operation in which the terminal sends data.

Optionally, there is a correspondence between a type of a terminal and a HARQ operation in which a terminal receives data. There is a correspondence between a type of a terminal and a HARQ operation in which a terminal sends data. The correspondence may be predefined in a protocol, or may be notified by the network device to the terminal by using signaling, for example, by using higher layer signaling or physical layer signaling.

For example, in the first set of the type-1 terminal, uplink HARQ operations are a1' and a2', and/or downlink HARQ operations are a1* and a2*.

For example, in the first set of the type-2 terminal, uplink HARQ operations are b1' and b2', and/or downlink HARQ operations are b1* and b2*.

For example, in the first set of the type-X terminal, uplink HARQ operations are x1' and x2', and/or downlink HARQ operations are x1* and x2*.

Optionally, there is a correspondence between a type of a terminal and a HARQ operation in which a terminal receives data. There is a correspondence between a type of a terminal and a HARQ operation in which a terminal sends data. The correspondence may be predefined in a protocol, or may be notified by the network device to the terminal by using signaling, for example, by using higher layer signaling or physical layer signaling.

Table 11 shows another example of a correspondence between a type of a terminal and a HARQ operation.

TABLE 11

| Type of a terminal | HARQ operation |
|---|---|
| Type 1 | Uplink HARQ operation a1', a2', . . . , and an', and/or downlink HARQ operations a1*, a2*, . . . , and an* |
| Type 2 | Uplink HARQ operation b1', b2', . . . , and bn', and/or downlink HARQ operations b1*, b2*, . . . , and bn* |
| . . . | . . . |
| Type X | Uplink HARQ operation x1', x2', . . . , and xn', and/or downlink HARQ operations x1*, x2*, . . . , and xn* |

The type 1 to the type X of the terminals each may be one of the foregoing types, such as an eMBB terminal, a URLLC terminal, an IoT terminal, CPE, a V2X terminal, an AR terminal, and a VR terminal. The uplink HARQ operations a1' to an', b1' to bn', and x1' to xn', and the downlink HARQ operations a1* to an*, b1* to bn*, and x1* to xn* may be at least one of the foregoing HARQ operations, such as no ACK/NACK feedback, codeword-level ACK/NACK feedback, code block group-level ACK/NACK feedback, synchronous HARQ, asynchronous HARQ, adaptive HARQ, and non-adaptive HARQ. an', bn', xn', an*, bn*, and xn* are positive integers, and may have a same value or different values.

(7) Retransmission Manner

The retransmission manner may include one or more of the following: blind retransmission, codeword-level retransmission, and code block group-level retransmission.

Blind retransmission: To be specific, when sending data, the terminal and/or the network device may perform retransmission or repeated sending based on a quantity of transmissions. For example, a HARQ does not need to be received. Instead, when data is sent for the first time, a plurality of transmissions, blind retransmission, or a plurality of blind retransmissions are directly performed. Data is transmitted in a blind retransmission manner. This reduces a latency, reduces uplink feedback overheads, and improves communication performance.

Codeword-level retransmission: To be specific, a granularity of data retransmission is a codeword. For example, if the codeword is transmitted correctly, retransmission is not required; or if the codeword is transmitted incorrectly, the entire codeword is to be retransmitted. One codeword may also be referred to as one TB.

Code block group-level retransmission: To be specific, a granularity of data retransmission is a code block group. Compared with the codeword-level retransmission, the code block group-level retransmission can implement retransmission at a smaller granularity. CBG transmission is configurable, and only a user configured with CBG-based transmission can perform retransmission based on the CBG. Retransmission is performed for each CBG, so that resource utilization can be improved, and retransmission of redundant information can be avoided. In addition, a waste of resources caused by excessively large uplink feedback signaling can be avoided.

Different types of terminals may have different requirements on data transmission. Therefore, the terminal and/or the network device may determine and/or use a more suitable retransmission manner based on the type of the terminal. This customizes a minimum feature set of the terminal, reduces chip costs of the terminal, implements terminal energy saving, and improves communication performance.

For example, one type of terminal may correspond to one feature set, and the feature set may include one or more retransmission manners. The retransmission manner may be at least one of the foregoing retransmission manners, or may be another retransmission manner. A HARQ operation may correspond to a retransmission manner.

For example, the first set of the type-1 terminal includes retransmission manners aR1 and aR2.

For example, the first set of the type-2 terminal includes retransmission manners bR1 and bR2.

For example, the first set of the type-X terminal includes retransmission manners xR1 and xR2.

In this application, the terminal and/or the network device may determine and/or use a more suitable retransmission manner based on the type of the terminal.

For example, the first set of the first-type terminal includes blind retransmission and codeword-level retransmission. For example, the first-type terminal may be a URLLC terminal. Considering that the first-type terminal may perform low-latency and high-reliability service transmission of small-sized data or medium data, ACK/NACK feedback may not be performed. Instead, a plurality of retransmissions may be directly performed, so that a latency can be reduced. A plurality of repeated transmissions are performed, so that reliability can be improved, and a latency caused by first feedback and then retransmission can be reduced. In a scenario in which small-sized data is transmitted, codeword-level retransmission may alternatively be performed.

For example, the first set of the second-type terminal includes blind retransmission. For example, the second-type terminal may be an IoT terminal. Considering that the second-type terminal may perform regular service transmission of small-sized data, no ACK/NACK feedback may be performed. This reduces processing complexity, reduces terminal costs, and improves transmission efficiency.

For example, the first set of the third-type terminal includes codeword-level retransmission and CBG-level retransmission. For example, the third-type terminal may be a CPE terminal. Considering that a feature of the third-type terminal is static and large-sized data transmission, the codeword-level retransmission manner and the CBG-level retransmission manner may be used. This can avoid repeated transmission of a redundant and correct CBG, and improve transmission efficiency.

For example, the first set of the fourth-type terminal includes codeword-level retransmission. For example, the fourth-type terminal may be an eMBB terminal.

In this application, optionally, there is a correspondence between a type of a terminal and a retransmission manner. The correspondence may be predefined in a protocol, or may be notified by a base station or a core network to the terminal by using signaling, for example, by using higher layer signaling or physical layer signaling.

Table 12 shows an example of a correspondence between a type of a terminal and a retransmission manner.

TABLE 12

| Type of a terminal | Retransmission manner |
| --- | --- |
| Type 1 | Retransmission manners aR1, aR2, . . . , and aRn |
| Type 2 | Retransmission manners bR1, bR2, . . . , and bRn |
| . . . | . . . |
| Type X | Retransmission manners xR1, xR2, . . . , and xRn |

The type 1 to the type X of the terminals each may be one of the foregoing types, such as an eMBB terminal, a URLLC terminal, an IoT terminal, CPE, a V2X terminal, an AR terminal, and a VR terminal. The retransmission modes aR1 to aRn, bR1 to bRn, and xR1 to xRn may be at least one of the foregoing retransmission manners, such as blind retransmission, codeword-level retransmission, and code block group-level retransmission. aRn, bRn, . . . , and xRn are positive integers, and may have a same value or different values.

Table 13 shows an example of a correspondence between a type of a terminal and a retransmission manner. The correspondence between a type of a terminal and a retransmission manner may be at least one row and/or at least one column in the following table.

TABLE 13

| Type of a terminal | Retransmission manner |
| --- | --- |
| First type (for example, URLLC terminal) | Blind retransmission and codeword-level retransmission |
| Second type (for example, IoT terminal) | Blind retransmission |

TABLE 13-continued

| Type of a terminal | Retransmission manner |
|---|---|
| Third type (for example, CPE terminal) | Codeword-level retransmission and CBG-level retransmission |
| Fourth type (for example, eMBB terminal) | Codeword-level retransmission |

In this application, the retransmission manner may be a retransmission manner in which the terminal receives data, for example, a downlink retransmission manner, or may be a retransmission manner in which the terminal sends data, for example, an uplink retransmission manner.

In some implementations, for receiving data by the terminal and sending data by the terminal, the terminal and/or the network device may separately determine/define a retransmission manner based on the type of the terminal. In this way, the first set of the terminal includes a retransmission manner in which the terminal receives data and/or a retransmission manner in which the terminal sends data.

Optionally, there is a correspondence between a type of a terminal and a retransmission manner in which a terminal receives data. There is a correspondence between a type of a terminal and a retransmission manner in which a terminal sends data. The correspondence may be predefined in a protocol, or may be notified by the network device to the terminal by using signaling, for example, by using higher layer signaling or physical layer signaling.

For example, in the first set of the type-1 terminal, uplink retransmission manners are aR1' and aR2', and/or downlink retransmission manners are aR1*and aR2*.

For example, in the first set of the type-2 terminal, uplink retransmission manners are bR1' and bR2', and/or downlink retransmission manners are bR1* and bR2*.

For example, in the first set of the type-X terminal, uplink retransmission manners are xR1' and xR2', and/or downlink retransmission manners are xR1* and xR2*.

Optionally, there is a correspondence between a type of a terminal and a retransmission manner in which a terminal receives data. There is a correspondence between a type of a terminal and a retransmission manner in which a terminal sends data. The correspondence may be predefined in a protocol, or may be notified by the network device to the terminal by using signaling, for example, by using higher layer signaling or physical layer signaling.

Table 14 shows another example of a correspondence between a type of a terminal and a retransmission manner.

retransmission manners, such as blind retransmission, codeword-level retransmission, and code block group-level retransmission. aRn', bRn', xRn', aRn*, bRn*, and xRn* are positive integers, and may have a same value or different values.

(8) Terminal Processing Capability

The terminal processing capability may include at least one of the following: a PUSCH processing capability, a PDSCH processing capability, a sidelink processing capability, and a CSI processing capability. The PUSCH processing capability may be referred to as PUSCH processing time, PUSCH preparation time, or sending preparation time. The PDSCH processing capability may be referred to as PDSCH preparation time, PDSCH decoding time, or receiving preparation time. The sidelink processing capability may be referred to as physical sidelink shared channel (PSSCH) preparation time, sending sidelink preparation time, or receiving sidelink preparation time. The CSI processing capability may be referred to as a CSI calculation latency requirement capability or CSI calculation time.

For example, the PDSCH processing capability may refer to time from receiving a PDCCH by the terminal to receiving a PDSCH by the terminal, where the PDCCH carries DCI, and the DCI is used to schedule the PUSCH.

For example, the PDSCH processing capability may refer to time from receiving a PDSCH by the terminal to sending feedback information by the terminal.

For example, the sidelink processing capability may refer to time from receiving sidelink control information by the terminal to sending sidelink data by the terminal, where the sidelink control information is used to schedule the sidelink data.

For example, the CSI processing capability may refer to time from receiving a CSI reporting indication by the terminal to feeding back CSI by the terminal, where the CSI reporting indication indicates the terminal to report the CSI, and may be triggered by using DCI.

The PUSCH processing capability may include at least one of the following: a PUSCH processing capability 1, a

TABLE 14

| Type of a terminal | Retransmission manner |
|---|---|
| Type 1 | Uplink retransmission manners aR1', aR2', . . . , and aRn', and/or downlink retransmission manners aR1*, aR2*, . . . , and aRn* |
| Type 2 | Uplink retransmission manners bR1', bR2', . . . , and bRn', and/or downlink retransmission manners bR1*, bR2*, . . . , and bRn* |
| . . . | . . . |
| Type X | Uplink retransmission manners xR1', xR2', . . . , and xRn', and/or downlink retransmission manners xR1*, xR2*, . . . , and xRn* |

The type 1 to the type X of the terminals each may be one of the foregoing types, such as an eMBB terminal, a URLLC terminal, an IoT terminal, CPE, a V2X terminal, an AR terminal, and a VR terminal. The uplink retransmission manners aR1' to aRn', bR1' to bRn', and xR1' to xRn', and the downlink retransmission manners aR1*to aRn*, bR1* to bRn*, and xR1* to xRn* may be at least one of the foregoing PUSCH processing capability 2, a PUSCH processing capability 3, and a PUSCH processing capability 4.

For the PUSCH processing capability 1 and the PUSCH processing capability 2, refer to the foregoing related descriptions.

For example, Table 2 shows a PUSCH processing capability 1, Table 3 shows a PUSCH processing capability 2, Table 15 shows a PUSCH processing capability 3, and Table 16 shows a PUSCH processing capability 4. In Table 2, Table 3, Table 15, and Table 16, P represents subcarrier spacing configuration information, and a value of P is shown in Table 4.

The PUSCH processing capability 3 may be a stronger processing capability. The processing capability 3 may also be referred to as an ultra-short latency processing capability, an ultra-low latency processing capability, an enhanced processing capability, ultra-low latency processing timing, ultra-short latency processing timing, or the like. For example, processing time is less than five symbols, for example, may be ns-level processing time.

TABLE 15

| $\mu$ | PUSCH preparation time $N_2$ [symbol] |
|---|---|
| 0 | 3 |
| 1 | 4 |
| 2 | 9 |
| 3 | 18 |

The PUSCH processing capability 4 may be a weaker processing capability. The processing capability 4 may also be referred to as an ultra-long latency processing capability, an ultra-high latency processing capability, a weakened processing capability, ultra-long latency processing timing, ultra-high latency processing timing, a relaxing processing capability, or a low-cost processing capability. For example, processing time is greater than 20 symbols, for example, may be ms-level processing time.

TABLE 16

| $\mu$ | PUSCH preparation time $N_2$ [symbol] |
|---|---|
| 0 | 12 |
| 1 | 14 |
| 2 | 25 |
| 3 | 38 |

The PDSCH processing capability may include at least one of the following: a PDSCH processing capability 1, a PDSCH processing capability 2, a PDSCH processing capability 3, and a PDSCH processing capability 4.

For example, Table 17 shows a PDSCH processing capability 1, Table 18 shows a PDSCH processing capability 2, Table 19 shows a PDSCH processing capability 3, and Table 20 shows a PDSCH processing capability 4. In Table 17, Table 18, Table 19, and Table 20, $\mu$ represents subcarrier spacing configuration information, and a value of $\mu$ is shown in Table 4.

TABLE 17

| | PDSCH decoding time $N_1$ [symbol] | |
|---|---|---|
| $\mu$ | A quantity of additional demodulation reference signals (DMRSs) is set to 0 | There is no additional DMRS, or there is no higher layer signaling configuration |
| 0 | 8 | $N_{1,0}$ |
| 1 | 10 | 13 |
| 2 | 17 | 20 |
| 3 | 20 | 24 |

TABLE 18

| $\mu$ | PDSCH decoding time $N_1$ [symbol] A quantity of additional DMRSs is set to 0 |
|---|---|
| 0 | 3 |
| 1 | 4.5 |
| 2 | 9 for a frequency range 1 |

The PDSCH processing capability 3 may be a stronger processing capability. The processing capability 3 may also be referred to as an ultra-short latency processing capability, an ultra-low latency processing capability, an enhanced processing capability, ultra-low latency processing timing, ultra-short latency processing timing, or the like. For example, processing time is less than three symbols, for example, may be ns-level processing time.

TABLE 19

| $\mu$ | PDSCH decoding time $N_1$ [symbol] A quantity of additional DMRSs is set to 0 |
|---|---|
| 0 | 2 |
| 1 | 4 |
| 2 | 8 for a frequency range 1 |

The PDSCH processing capability 4 may be a weaker processing capability. The processing capability 4 may also be referred to as an ultra-long latency processing capability, an ultra-high latency processing capability, a weakened processing capability, ultra-long latency processing timing, ultra-high latency processing timing, a relaxing processing capability, or a low-cost processing capability. For example, processing time is greater than 20 symbols, for example, may be ms-level processing time.

TABLE 20

| $\mu$ | PDSCH decoding time $N_1$ [symbol] A quantity of additional DMRSs is set to 0 |
|---|---|
| 0 | 10 |
| 1 | 12 |
| 2 | 18 for a frequency range 1 |

When the PDCCH and the PDSCH have different carrier spacings, a PDSCH processing capability for cross-carrier scheduling may include at least one of the following: a PDSCH processing capability 1 for cross-carrier scheduling, a PDSCH processing capability 2 for cross-carrier scheduling, and a PDSCH processing capability 3 for cross-carrier scheduling.

For example, Table 21 shows a PDSCH processing capability 1 for cross-carrier scheduling, Table 22 shows a PDSCH processing capability 2, and Table 23 shows a PDSCH processing capability 3. In Table 21, Table 22, and Table 23, $\mu$ represents subcarrier spacing configuration information, and a value of $\mu$ is shown in Table 4. A $\mu$PDCCH refers to a subcarrier spacing of the PDCCH.

TABLE 21

| $\mu$PDCCH | Npdsch [symbol] |
|---|---|
| 0 | 4 |
| 1 | 5 |
| 2 | 10 |
| 3 | 14 |

The PDSCH processing capability 2 for cross-carrier scheduling may be a stronger processing capability. The processing capability 3 may also be referred to as an ultra-short latency processing capability, an ultra-low latency processing capability, an enhanced processing capability, ultra-low latency processing timing, ultra-short latency processing timing, or the like. For example, processing time is less than 10 symbols, for example, may be ns-level processing time.

TABLE 22

| $\mu$PDCCH | Npdsch [symbol] |
|---|---|
| 0 | 3 |
| 1 | 4 |
| 2 | 8 |
| 3 | 12 |

The PDSCH processing capability 3 for cross-carrier scheduling may be a weaker processing capability. The processing capability 4 may also be referred to as an ultra-long latency processing capability, an ultra-high latency processing capability, a weakened processing capability, ultra-long latency processing timing, ultra-high latency processing timing, a relaxing processing capability, or a low-cost processing capability. For example, processing time is greater than 14 symbols, for example, may be ms-level processing time.

TABLE 23

| $\mu$PDCCH | Npdsch [symbol] |
|---|---|
| 0 | 6 |
| 1 | 8 |
| 2 | 12 |
| 3 | 16 |

The PSSCH processing capability may include at least one of the following: a PSSCH processing capability 1, a PSSCH processing capability 2, and a PSSCH processing capability 3.

For example, Table 24 shows a PSSCH processing capability 1, Table 25 shows a PSSCH processing capability 2, and Table 26 shows a PSSCH processing capability 3. In Table 24, Table 25, and Table 26, $\mu$ represents subcarrier spacing configuration information, and a value of $\mu$ is shown in Table 4.

TABLE 24

| $\mu$ | PSSCH preparation time $N_2$ [symbol] |
|---|---|
| 0 | 10 |
| 1 | 12 |

TABLE 24-continued

| $\mu$ | PSSCH preparation time $N_2$ [symbol] |
|---|---|
| 2 | 23 |
| 3 | 36 |

The PSSCH processing capability 2 may be a stronger processing capability. The processing capability 3 may also be referred to as an ultra-short latency processing capability, an ultra-low latency processing capability, an enhanced processing capability, ultra-low latency processing timing, ultra-short latency processing timing, or the like. For example, processing time is less than 10 symbols, for example, may be ns-level processing time.

TABLE 25

| $\mu$ | PSSCH preparation time $N_2$ [symbol] |
|---|---|
| 0 | 8 |
| 1 | 10 |
| 2 | 20 |
| 3 | 34 |

The PSSCH processing capability 3 may be a weaker processing capability. The processing capability 4 may also be referred to as an ultra-long latency processing capability, an ultra-high latency processing capability, a weakened processing capability, ultra-long latency processing timing, ultra-high latency processing timing, a relaxing processing capability, or a low-cost processing capability. For example, processing time is greater than 36 symbols, for example, may be ms-level processing time.

TABLE 26

| $\mu$ | PSSCH preparation time $N_2$ [symbol] |
|---|---|
| 0 | 12 |
| 1 | 14 |
| 2 | 25 |
| 3 | 38 |

The CSI processing capability may include at least one of the following: a CSI processing capability 1, a CSI processing capability 2, a CSI processing capability 3, and a CSI processing capability 4.

For example, Table 27 shows a CSI processing capability 1, Table 28 shows a CSI processing capability 2, Table 29 shows a CSI processing capability 3, and Table 30 shows a CSI processing capability 4. In Table 27, Table 28, Table 29, and Table 30, $\mu$ represents subcarrier spacing configuration information, and a value of $\mu$ is shown in Table 4.

TABLE 27

| $\mu$ | $Z_1$ [symbol] | |
|---|---|---|
| | $Z_1$ | $Z'_1$ |
| 0 | 10 | 8 |
| 1 | 13 | 11 |
| 2 | 25 | 21 |
| 3 | 43 | 36 |

TABLE 28

| μ | $Z_1$ [symbol] | | $Z_2$ [symbol] | | $Z_3$ [symbol] | |
|---|---|---|---|---|---|---|
| | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $\min(44, X_2 + KB_1)$ | $X_2$ |
| 3 | 97 | 85 | 152 | 140 | $\min(97, X_3 + KB_2)$ | $X_3$ |

The CSI processing capability 3 may be a stronger processing capability. The processing capability 3 may also be referred to as an ultra-short latency processing capability, an ultra-low latency processing capability, an enhanced processing capability, ultra-low latency processing timing, ultra-short latency processing timing, or the like. For example, processing time is less than 10 symbols, for example, may be ns-level processing time.

TABLE 29

| μ | $Z_1$ [symbol] | |
|---|---|---|
| | $Z_1$ | $Z'_1$ |
| 0 | 8 | 6 |
| 1 | 12 | 10 |
| 2 | 23 | 20 |
| 3 | 41 | 34 |

The CSI processing capability 4 may be a weaker processing capability. The processing capability 4 may also be referred to as an ultra-long latency processing capability, an ultra-high latency processing capability, a weakened processing capability, ultra-long latency processing timing, ultra-high latency processing timing, a relaxing processing capability, or a low-cost processing capability. For example, processing time is greater than 36 symbols, for example, may be ms-level processing time.

TABLE 30

| μ | $Z_1$ [symbol] | |
|---|---|---|
| | $Z_1$ | $Z'_1$ |
| 0 | 12 | 10 |
| 1 | 15 | 13 |
| 2 | 27 | 23 |
| 3 | 45 | 38 |

In this application, the terminal and/or the network device may determine and/or define the terminal processing capability based on the type of the terminal.

For example, the first set of the first-type terminal may include at least one of the following: a PUSCH processing capability 2, a PUSCH processing capability 3, a PDSCH processing capability 2, a PDSCH processing capability 3, a PSSCH processing capability 2, a CSI processing capability 2, and a CSI processing capability 3. For example, the first-type terminal may be a URLLC terminal. Considering that the first-type terminal transmits an ultra-low latency service, the terminal is required to have a stronger processing capability. Therefore, the PUSCH processing capability 2, the PUSCH processing capability 3, the PDSCH processing capability 2, the PDSCH processing capability 3, the PSSCH processing capability 2, the CSI processing capability 2, and/or the CSI processing capability 3 may be used as a mandatory feature of the first-type terminal. This meets a low-latency requirement, and improves communication performance.

For example, the first set of the second-type terminal may include at least one of the following: a PUSCH processing capability 4, a PDSCH processing capability 4, a PSSCH processing capability 3, and a CSI processing capability 4. For example, the second-type terminal may be an IoT terminal. Considering a low-cost requirement of the second-type terminal, the terminal is required to have a weaker processing capability. Therefore, the PUSCH processing capability 4, the PDSCH processing capability 4, the PSSCH processing capability 3, and/or the CSI processing capability 4 may be used as a mandatory feature of the second-type terminal. This meets a low-cost requirement, and improves communication performance.

For example, the first set of the fourth-type terminal may include a processing capability 1. For example, the fourth-type terminal may be an eMBB terminal.

The foregoing (5), (6), (7), and (8) may be combined with each other. Different types of terminals have different data transmission requirements. Therefore, a more suitable feature set may be determined and/or used.

For example, one type of terminal may correspond to one feature set, and the feature set may include one or more modulation schemes, one or more HARQ operation manners, one or more retransmission manners, and one or more terminal processing capabilities.

For example, the first set of the first-type terminal may include slot aggregation, dynamic scheduling, configured grant, a processing capability 2, and a processing capability 3. For example, the first-type terminal may be a URLLC terminal.

For example, the first set of the second-type terminal may include repeated PDSCH transmission and configured grant. For example, the second-type terminal may be an IoT terminal.

For example, the first set of the third-type terminal may include slot aggregation, dynamic scheduling, codeword-level ACK/NACK feedback, codeword-level retransmission, CBG-level ACK/NACK feedback, CBG-level retransmission, and a processing capability 1. For example, the third-type terminal may be a CPE terminal.

For example, the first set of the fourth-type terminal may include intra-slot frequency hopping, dynamic scheduling, codeword-level ACK/NACK feedback, codeword-level retransmission, and a processing capability 1.

In the foregoing embodiment, a terminal capability set may be customized. The terminal and/or the network device may customize a capability/feature of the terminal based on the type of the terminal, so that the feature matches the type of the terminal. This meets various device requirements, reduces communication complexity, reduces chip costs, and reduces power consumption.

(9) MIMO

The MIMO feature may include one or more of the following: a basic PDSCH transmission capability (basic PDSCH reception), PDSCH beam switching, MIMO multi-layer transmission, a multi-transmission configuration indication state (multi-TCI state), a DMRS, beam correlation, channel state information (CSI) measurement and feedback (CSI measurement and feedback), AI based CSI, and the like.

The basic PDSCH transmission capability includes data resource element mapping (data RE mapping), single layer data transmission, and a single TCI state.

The TCI status indicates quasi co-located (QCL) information of an antenna port. The quasi co-located information may be information used to determine a large-scale feature parameter of a channel. That there is a quasi co-located relationship between two antenna ports means that a channel large-scale feature parameter of one antenna port may be inferred by using a channel large-scale feature parameter conveyed by using the other antenna port. The large-scale feature parameter may include one or more of an average gain, an average delay, delay spread, a Doppler shift, Doppler spread, or a spatial parameter (or spatial Rx parameter).

The spatial parameter may include one or more of the following: an angle of arrival (AOA), a dominant angle of arrival (dominant AoA), an average angle of arrival (average AoA), an angle of departure (AOD), a channel correlation matrix, an angle of arrival power spread spectrum, an average angle of departure (average AoD), an angle of departure power spread spectrum, transmit channel correlation, receive channel correlation, transmit beamforming, receive beamforming, spatial channel correlation, a spatial filter, a spatial filter parameter, a spatial receive parameter, weight information, and the like.

The DMRS includes one or more of the following: a basic DMRS for a scheduling type A, a basic DMRS for a scheduling type B, a front-loaded one-symbol DMRS and an additional two-symbol DMRS (1+2 DMRS), a front-loaded two-symbol DMRS and an additional two-symbol DMRS (2+2 DMRS), and a front-loaded one-symbol DMRS and an additional three-symbol DMRS (1+3 DMRS).

The scheduling type A may be a slot-level scheduling manner, or may be referred to as a data channel mapping type A. The scheduling type B may be a sub-slot or symbol-level scheduling manner, or may be referred to as a data channel mapping type B.

The additional DMRS may be a DMRS other than the basic DMRS.

The basic DMRS may also be referred to as a front-loaded DMRS, and may be a DMRS that occupies a front symbol in DMRSs transmitted in a time unit. For example, the basic DMRS may be placed at a start or a relative front location of data. The additional DMRS may be a DMRS that occupies a rear symbol in DMRSs transmitted in a time unit. The basic DMRS and the additional DMRS may be carried at different symbol locations of a same scheduling unit. The same scheduling unit includes at least any one of a subframe, a slot, or a mini-slot. This is not particularly limited in this embodiment of this application.

Optionally, the additional DMRS may be used to improve accuracy of channel estimation, and is applicable to a high-speed moving scenario. Channels change on different symbols. To improve accuracy of channel estimation, the additional DMRS is introduced.

The beam correlation feature includes one or more of the following: periodic beam reporting, aperiodic beam reporting, semi-persistent beam reporting, and SSB or CSI-RS based beam measurement.

The AI based CSI refers to AI based CSI measurement and feedback, AI based channel state information obtaining, and the like.

Considering that different types of terminals have different features, different types of terminals may support different MIMO features. The terminal may support a part or all of the MIMO feature. This customizes a minimum feature set of the terminal, reduces chip costs of the terminal, implements terminal energy saving, and improves communication performance.

For example, the first set of the first-type terminal includes a basic PDSCH transmission capability. For example, the first-type terminal may be a URLLC terminal. A first-type terminal with a relatively low moving speed may support a single-symbol DMRS. This reduces chip costs, reduces processing complexity, implements terminal energy saving, and improves communication performance.

For example, the first set of the second-type terminal may include at least one of a basic PDSCH transmission capability, a 1+2 DMRS, and a 1+3 DMRS. For example, the second-type terminal may be an IoT terminal. Considering that the second-type terminal transmits small-sized data, to reduce costs, the first set of the terminal includes single-stream data transmission, and does not need to support MIMO multi-layer transmission. This reduces terminal costs, and improves communication performance. A second-type high-speed moving terminal may support a 1+3 DMRS. This improves channel estimation performance and communication performance.

For example, the first set of the third-type terminal may include at least one of MIMO multi-layer transmission and AI based CSI. For example, the third-type terminal may be a CPE terminal. To implement high-speed data transmission, the first set of the third-type terminal includes the MIMO multi-layer transmission. This implements high-speed transmission, and improves communication performance. In addition, a first set of a third-type terminal with a relatively strong capability may include AI based CSI. This improves accuracy of channel estimation, reduces a channel obtaining latency, reduces feedback overheads, and improves communication performance.

For example, the first set of the fourth-type terminal includes a basic PDSCH transmission capability, MIMO multi-layer transmission, a multi-TCI state, a 1+2 DMRS, and periodic beam reporting. For example, the fourth-type terminal may be an eMBB terminal.

(10) CSI Measurement and Feedback

The CSI measurement and feedback feature may include one or more of the following: time division duplexing (TDD) CSI measurement, frequency division duplexing (FDD) CSI measurement, CSI-RS configuration, CSI measurement and feedback configuration, a feedback amount, a codebook, no CSI measurement and feedback, and the like.

In TDD, the network device may obtain channel state information by receiving an SRS sent by the terminal. The TDD CSI measurement includes one or more of the following: periodic SRS sending, semi-persistent SRS sending, and aperiodic SRS sending.

In FDD, the network device needs to send a CSI-RS; and the terminal determines channel state information by receiving the CSI-RS, and sends the channel state information to the network device. The network device may determine the channel state information based on the CSI sent by the terminal.

In terms of a time granularity, the CSI measurement and feedback may include one or more of the following: periodic CSI measurement and feedback, semi-persistent CSI measurement and feedback, and aperiodic CSI measurement and feedback.

In terms of a frequency domain granularity, the CSI measurement and feedback may include one or more of the following: subband CSI measurement and feedback and full-band CSI measurement and feedback. The subband CSI measurement and feedback includes a subband precoding matrix indicator (PMI) and a subband channel quality indicator (CQI). The full-band CSI measurement and feedback includes a full-band PMI and a full-band CQI.

The CSI-RS configuration may include one or more of the following: a time-frequency domain resource density, a quantity of antenna ports, periodicity, semi-persistency, aperiodicity, a CSI-RS resource used for channel measurement, a CSI-RS resource used for interference measurement, and a CSI-RS resource used for beam tracking.

The CSI feedback amount may include one or more of the following: a rank (RI), a PMI, a CQI, reference signal received power (RSRP), a beam index, a CRI (CSI-RS resource identifier), AI based feedback, and the like.

The codebook may include one or more of the following: a type-1 single-panel codebook, a type-1 multi-panel codebook, a type-2 codebook, and a beam. The type-1 single-panel codebook is a codebook used for beam selection. The type-1 multi-panel codebook is a codebook for feeding back inter-panel phase information based on the type-1 single-panel codebook. The type-2 codebook is a codebook used for beam combination. The beam is a codebook used for port combination.

Considering that different types of terminals have different features, different types of terminals may support CSI measurement and feedback features. This customizes a minimum feature set of the terminal, reduces chip costs of the terminal, implements terminal energy saving, and improves communication performance.

For example, one type of terminal may correspond to one feature set, and the feature set may include one or more in the CSI measurement and feedback feature. The CSI measurement and feedback feature may be at least one of the foregoing CSI measurement and feedback features, or may be another CSI measurement and feedback feature.

For example, the first set of the type-1 terminal includes CSI measurement and feedback features AC1 and AC2. The first set of the type-2 terminal includes CSI measurement and feedback features BC1 and BC2. The first set of the type-X terminal includes CSI measurement and feedback features XC1 and XC2. For example, the first set of the first-type terminal includes at least one of no CSI measure- For example, the first set of the second-type terminal includes at least one of no CSI measurement and feedback and aperiodic CSI measurement and feedback. For example, the second-type terminal may be an IoT terminal. Considering a static scenario in which the second-type terminal is located, for example, a smart water meter, no CSI measurement and feedback may be performed. For a high-speed scenario in which the second-type terminal is located, aperiodic CSI measurement and feedback may be performed to trigger feedback, so that power consumption is reduced.

For example, the first set of the third-type terminal includes periodic CSI measurement and feedback. For example, the third-type terminal may be a CPE terminal. In a scenario in which the terminal is static and transmits large-sized data, because the terminal does not have mobility, the terminal may perform periodic measurement, and perform measurement once in a period of time, so that power consumption is reduced while channel information is obtained.

For example, the first set of the fourth-type terminal includes periodic CSI measurement and feedback and aperiodic CSI measurement and feedback. For example, the fourth-type terminal may be an eMBB terminal.

In this application, optionally, there is a correspondence between a type of a terminal and a CSI measurement and feedback manner. The correspondence may be predefined in a protocol, or may be notified by the network device to the terminal by using signaling, for example, by using higher layer signaling or physical layer signaling.

Table 31 shows an example of a correspondence between a type of a terminal and a CSI measurement and feedback manner. The correspondence between a type of a terminal and a CSI measurement and feedback manner may be at least one row and/or at least one column in the following table.

TABLE 31

| Type of a terminal | CSI measurement and feedback manner |
|---|---|
| Type 1 | CSI measurement and feedback manners AC1, AC2, . . . , and ACn |
| Type 2 | CSI measurement and feedback manners BC1, BC2, . . . , and BCn |
| . . . | . . . |
| Type X | CSI measurement and feedback manners XC1, XC2, . . . , and XCn | ment and feedback and periodic CSI measurement and feedback. For example, the first-type terminal may be a URLLC terminal. In a scenario in which the first-type terminal is used in a factory, a moving route of the terminal is known or predictable. Therefore, a channel environment is relatively stable, and no CSI measurement and feedback may be performed, so that power consumption and costs are reduced. Alternatively, some terminals may perform periodic measurement, perform measurement once in a period of time, and have a known or predictable route, so that power consumption is reduced while channel information is obtained.

The type 1 to the type X of the terminals each may be one of the foregoing types, such as an eMBB terminal, a URLLC terminal, an IoT terminal, CPE, a V2X terminal, an AR terminal, and a VR terminal. The CSI measurement and feedback manners AC1 to ACn, BC1 to BCn, and XC1 to XCn may be at least one of the foregoing CSI measurement and feedback manners. ACn, BCn, and XCn are positive integers, and may have a same value or different values.

Table 32 shows an example of a correspondence between a type of a terminal and a CSI measurement and feedback manner. The correspondence may be at least one row and/or at least one column in the following table.

TABLE 32

| Type of a terminal | CSI measurement and feedback manner |
|---|---|
| First type | Periodic CSI measurement and feedback and a quantity 4 or 8 of antenna ports |

TABLE 32-continued

| Type of a terminal | CSI measurement and feedback manner |
|---|---|
| Second type | Aperiodic CSI measurement and feedback |
| Fourth type | Periodic CSI measurement and feedback and a quantity 16 or 32 of antenna ports |

The foregoing features (1) to (10) may be combined with each other. Different types of terminals have different data transmission requirements. Therefore, a more suitable feature set may be determined and/or used.

For example, the first set of the first-type terminal includes at least one of the following features: a processing capability #3, a CP-OFDM waveform, type-B mapping, data transmission scheduling based on configured grant, slot aggregation, a quantity 2 of hybrid automatic repeat request HARQ processes, synchronization signal block based radio link management and/or radio resource management, aperiodic channel state information measurement and reporting, beam tracking, and beam management. For example, the first-type terminal may be a URLLC terminal.

For example, the first set of the second-type terminal includes at least one of the following features: a low-cost waveform, data channel repeated transmission, type-B mapping, data transmission scheduling based on configured grant, slot aggregation, and a quantity 1 of HARQ processes. For example, the second-type terminal may be an IoT terminal.

In this application, considering that different types of terminals have different features, a feature set may be separately defined for different types of terminals. This can customize and minimize the feature of the terminal, meet feature requirements of different types of terminals, reduce chip costs and terminal implementation processing complexity, and implement terminal energy saving.

In this application, a default value and/or a candidate value set of the feature of the terminal may be related to the type of the terminal.

An embodiment of this application provides a communication method for determining a default value of a feature and/or a candidate value set of a feature. Embodiments in this application may be independent, or may be combined with each other. This is not limited in this application.

Optionally, there is a correspondence between a default value of a feature of a terminal and a type of a terminal.

Optionally, there is a correspondence between a candidate value set of a feature of a terminal and a type of a terminal.

Optionally, a terminal and/or a network device may determine a default value of a feature based on the correspondence between a type of a terminal and a default value of a feature; and/or a terminal and/or a network device may determine a candidate value set of a feature based on the correspondence between a type of a terminal and a candidate value set of a feature.

The following uses a feature in a second set (namely, an optional feature of the terminal) as an example, to describe a relationship between a default value or a candidate value set of the feature of the terminal and a type of the terminal. It should be noted that definitions of a default value and/or a candidate value set of a feature in a first set (namely, a mandatory feature of the terminal) are similar to those in the second set. For details, refer to descriptions of the second set.

For reporting of an optional feature, the terminal may report whether a feature or some features are supported, or report a supported value. In the conventional technology, for various types of terminals, there is only one default value of a feature and only one candidate value set of a feature. This is applicable to all types of terminals.

In this application, for reporting of an optional feature, a default value or a candidate value set of a feature may be separately defined for different types of terminals. To be specific, the terminal and/or the network device may determine the default value of the feature based on the type of the terminal, and/or determine the candidate value set of the feature based on the type of the terminal. Optionally, the terminal and/or the network device may determine the candidate value set of the feature based on the type of the terminal, and determine, based on the candidate value set, a quantity of bits and a bit meaning indicated by the feature, to determine a value (a parameter value) of the feature.

This can reduce reporting overheads, match a plurality of chips, reduce chip costs, enable the feature of the terminal as required, and improve spectral efficiency.

In some implementations, the correspondence between a type of a terminal and a default value of a feature and/or the correspondence between a type of a terminal and a candidate value set of a feature may be predefined in a protocol or configured by using signaling. The signaling may be higher layer signaling or physical layer signaling. The following describes the technical solutions of this application with reference to examples.

(1) Supported Modulation Order

A feature parameter Modulation Order is used as an example.

Optionally, there is a correspondence between a candidate value set of a supported modulation order and a type of a terminal. The correspondence may be predefined in a protocol, or may be configured by the network device for the terminal by using signaling. This is not limited in this application. The signaling may be higher layer signaling or physical layer signaling.

For example, for a type-1 terminal, a candidate value set of a modulation order is {MA1, MA2, MA3, . . . , MAn}.

For example, for a type-2 terminal, a candidate value set of a modulation order is {MB1, MB2, MB3, . . . , MBn}.

For example, for a type-X terminal, a candidate value set of a modulation order is {MX1, MX2, MX3, . . . , MXn}.

MA1, MA2, MA3, . . . , MAn, MB1, MB2, MB3, . . . , MBn, MX1, MX2, MX3, . . . , and MXn may be one or more of the following: bpsk-halfpi, bpsk, qam16, qam64, qam256, qam1024, or another value.

Optionally, there is a correspondence between a default value of a supported modulation order and a type of a terminal. The correspondence may be predefined in a protocol, or may be configured by the network device for the terminal by using signaling. This is not limited in this application. The signaling may be higher layer signaling or physical layer signaling.

Optionally, a default value of the parameter value may be the $1^{st}$ value in the candidate value set.

For the first type to the fourth type:

For example, for a first-type terminal, a candidate value set of a modulation order is {bpsk-halfpi, bpsk, qam16}. If the candidate value set is represented in binary, each value may be indicated by using two bits. In other words, for the first-type terminal, a quantity of bits of an indication of the modulation order is 2. For example, for the first-type terminal, a bit meaning of the indication of the modulation order may be: a bit 00 represents bpsk-halfpi, a bit 01 represents bpsk, and a bit 10 represents qam16. For example, the first-type terminal may be a URLLC terminal.

For example, a default value of the modulation order of the first-type terminal is bpsk-halfpi. For example, the first-type terminal may be a URLLC terminal.

For example, for a second-type terminal, a candidate value set of a modulation order is {bpsk-halfpi, bpsk, qam16}. If the candidate value set is represented in binary, each value may be indicated by using two bits. In other words, for the second-type terminal, a quantity of bits of an indication of the modulation order is 2. For example, for the second-type terminal, a bit meaning of the indication of the modulation order may be: a bit 00 represents bpsk-halfpi, a bit 01 represents bpsk, and a bit 10 represents qam16. For example, the second-type terminal may be an IoT terminal.

For example, a default value of the modulation order of the second-type terminal is bpsk-halfpi. For example, the second-type terminal may be an IoT terminal.

For example, for a third-type terminal, a candidate value set of a modulation order is {qam16, qam64, qam256, qam1024}. If the candidate value set is represented in binary, each value may be indicated by using two bits. In other words, for the third-type terminal, a quantity of bits of an indication of the modulation order is 2. For example, for the third-type terminal, a bit meaning of the indication of the modulation order may be: a bit 00 represents qam16, a bit 01 represents qam64, a bit 10 represents qam256, and a bit 11 represents qam1024. For example, the third-type terminal may be a CPE terminal.

For example, a default value of the modulation order of the third-type terminal is qam16. For example, the third-type terminal may be a CPE terminal.

For example, for a fourth-type terminal, a candidate value set of a modulation order is {bpsk-halfpi, bpsk, qam16, qam64, qam256}. If the candidate value set is represented in binary, each value may be indicated by using three bits. In other words, for the fourth-type terminal, a quantity of bits of an indication of the modulation order is 3. For example, for the fourth-type terminal, a bit meaning of the indication of the modulation order may be: a bit 000 represents bpsk-halfpi, a bit 001 represents bpsk, a bit 010 represents qam16, a bit 011 represents qam64, and a bit 100 represents qam256. For example, the fourth-type terminal may be an eMBB terminal.

For example, a default value of the modulation order of the fourth-type terminal is bpsk-halfpi. For example, the fourth-type terminal may be an eMBB terminal.

Optionally, the terminal and/or the network device may determine, based on the type of the terminal, the candidate value set indicated by the modulation order, and determine, based on the candidate value set, the quantity of bits and the bit meaning indicated by the modulation order, to determine a value (a parameter value) of the modulation order.

Considering communication features of different types of terminals, a candidate value set indicated by a modulation order corresponding to a type of a terminal is designed. This can reduce reporting overheads, match a plurality of chips, reduce chip costs, enable terminal energy saving as required, and improve spectral efficiency.

(2) Maximum Quantity, of CSI-RS Resources Used for RLM, Supported by a Terminal

A feature parameter maxNumberResource-CSI-RS-RLM is used as an example.

Optionally, there is a correspondence between a type of a terminal and a candidate value set of a supported maximum quantity of CSI-RS resources used for RLM. The correspondence may be predefined in a protocol, or may be configured by the network device for the terminal by using signaling. This is not limited in this application. The signaling may be higher layer signaling or physical layer signaling.

For example, for a type-1 terminal, a candidate value set of a maximum quantity is {MCA1, MCA2, MCA3, . . . , MCAn}

For example, for a type-2 terminal, a candidate value set of a maximum quantity is {MCB1, MCB2, MCB3, . . . , MCBn}.

For example, for a type-X terminal, a candidate value set of a maximum quantity is {MCX1, MCX2, MCX3, . . . , MCXn}.

MCA1, MCA2, MCA3, . . . , MCAn, MCB1, MCB2, MCB3, . . . , MCBn, MCX1, MCX2, MCX3, . . . , and MCXn may be one or more of the following: n2, n4, n6, n8, and n12. Maximum quantities corresponding to n2, n4, n6, n8, and n12 are respectively 2, 4, 6, 8, and 12, or other values.

Optionally, there is a correspondence between a type of a terminal and a default value of a supported maximum quantity of CSI-RS resources used for RLM. The correspondence may be predefined in a protocol, or may be configured by the network device for the terminal by using signaling. This is not limited in this application. The signaling may be higher layer signaling or physical layer signaling.

Optionally, a default value of the parameter value may be the Pt value in the candidate value set.

For the first type to the fourth type: For example, for a first-type terminal, a candidate value set of a maximum quantity is {n2, n4}. If the candidate value set is represented in binary, each value may be indicated by using one bit. For example, the first-type terminal may be a URLLC terminal. Considering that a moving route of the first-type terminal is known or predictable, a channel environment is relatively stable, and there may be a relatively small quantity of resources used for RLM. This can reduce power consumption, costs, and reporting overheads. In other words, for the first-type terminal, a quantity of bits of an indication of the quantity of resources used for RLM is 1. For example, for the first-type terminal, a bit meaning of the indication of the quantity of resources used for RLM may be: a bit 0 represents 2, and a bit 1 represents 4.

For example, for the first-type terminal, a default value of the indication of the quantity of resources used for RLM is 2. For example, the first-type terminal may be a URLLC terminal.

For example, for a second-type terminal, a candidate value set of a maximum quantity is {n6, n8}. If the candidate value set is represented in binary, each value may be indicated by using one bit. For example, the second-type terminal may be an IoT terminal. In a high-speed moving scenario, a channel environment changes rapidly, and there may be a relatively large quantity of resources used for RLM. This can reduce power consumption, costs, and reporting overheads. In other words, for the second-type terminal, a quantity of bits of an indication of the quantity of resources used for RLM is 1. For example, for the second-type terminal, a bit meaning of the indication of the quantity of resources used for RLM may be: a bit 0 represents 6, and a bit 1 represents 8.

For example, for the second-type terminal, a default value of the indication of the quantity of resources used for RLM is 6. For example, the second-type terminal may be an IoT terminal.

For example, for a third-type terminal, a candidate value set of a maximum quantity is {n4, n6}. If the candidate value set is represented in binary, each value may be indicated by using one bit. For example, the third-type terminal may be a CPE terminal. Because the third-type terminal does not have mobility, and transmits large-sized data, there may be a relatively medium quantity of resources used for RLM, and measurement is performed once in a period of time. This minimizes power consumption and reduces costs and reporting overheads while obtaining channel information. In other words, for the third-type terminal, a quantity of bits of an indication of the quantity of resources used for RLM is 1. For example, for the third-type terminal, a bit meaning of the indication of the quantity of resources used for RLM may be: a bit 0 represents 4, and a bit 1 represents 6.

For example, for the third-type terminal, a default value of the indication of the quantity of resources used for RLM is 4. For example, the third-type terminal may be a CPE terminal.

For example, for a fourth-type terminal, a candidate value set of a maximum quantity is {n2, n4, n6, n8, n12}. If the candidate value set is represented in binary, each value may be indicated by using three bits. For example, the fourth-type terminal may be an eMBB terminal. In other words, for the fourth-type terminal, a quantity of bits of an indication of the quantity of resources used for RLM is 3. For example, for the fourth-type terminal, a bit meaning of the indication of the quantity of resources used for RLM may be: a bit 000 represents 2, a bit 001 represents 4, a bit 010 represents 6, a bit 011 represents 8, a bit 100 represents 12, and so on.

For example, for the fourth-type terminal, a default value of the indication of the quantity of resources used for RLM is 2. For example, the fourth-type terminal may be an eMBB terminal.

Optionally, the terminal and/or the network device may determine, based on the type of the terminal, the candidate value set of the indication of the quantity of resources used for RLM, and determine, based on the candidate value set, the quantity of bits and the bit meaning of the indication of the quantity of resources used for RLM, to determine a value (a parameter value) of the quantity of resources used for RLM.

Considering communication features of different types of terminals, a candidate value set of an indication of a quantity, of resources used for RLM, corresponding to a type of a terminal is designed. This can reduce reporting overheads, match a plurality of chips, reduce chip costs, enable terminal energy saving as required, and improve spectral efficiency.

(3) Maximum Quantity, of CSI-RS Resources Used for RRM, Supported by a Terminal

A feature parameter maxNumberCSI-RS-RRM-RS-SINR is used as an example.

Optionally, there is a correspondence between a type of a terminal and a candidate value set of a supported maximum quantity of CSI-RS resources used for RRM. The correspondence may be predefined in a protocol, or may be configured by the network device for the terminal by using signaling. This is not limited in this application. The signaling may be higher layer signaling or physical layer signaling.

For example, for a type-1 terminal, a candidate value set of a maximum quantity is {MMA1, MMA2, MMA3, . . . , MMAn}

For example, for a type-2 terminal, a candidate value set of a maximum quantity is {MMB1, MMB2, MMB3, . . . , MMBn}.

For example, for a type-X terminal, a candidate value set of a maximum quantity is {MMX1, MMX2, MMX3, . . . , MMXn}.

MMA1, MMA2, MMA3, . . . , MMAn, MMB1, MMB2, MMB3, . . . , MMBn, MMX1, MMX2, MMX3, . . . , and MMXn may be one or more of the following: n4, n8, n16, n32, n64, and n96. Maximum quantities corresponding to n4, n8, n16, n32, n64, and n96 are respectively 4, 6, 8, 16, 32, 64, and 96, or other values.

Optionally, there is a correspondence between a type of a terminal and a default value of a supported maximum quantity of CSI-RS resources used for RRM. The correspondence may be predefined in a protocol, or may be configured by the network device for the terminal by using signaling. This is not limited in this application. The signaling may be higher layer signaling or physical layer signaling.

Optionally, a default value of a parameter value may be the Pt value in the candidate value set.

For the first type to the fourth type:

For example, for a first-type terminal, a candidate value set of a maximum quantity is {n4, n8}. If the candidate value set is represented in binary, each value may be indicated by using one bit. For example, the first-type terminal may be a URLLC terminal. Considering that a moving route of the first-type terminal is known or predictable, a channel environment is relatively stable, and there may be a relatively small quantity of resources used for RRM measurement. This can reduce power consumption, costs, and reporting overheads. In other words, for the first-type terminal, a quantity of bits of an indication of the quantity of resources used for RRM is 1. For example, for the first-type terminal, a bit meaning of the indication of the quantity of resources used for RRM may be: a bit 0 represents 4, and a bit 1 represents 8.

For example, for the first-type terminal, a default value of the indication of the quantity of resources used for RRM is 4. For example, the first-type terminal may be a URLLC terminal.

For example, for a second-type terminal, a candidate value set of a maximum quantity is {n64, n96}. If the candidate value set is represented in binary, each value may be indicated by using one bit. For example, the second-type terminal may be an IoT terminal. In a high-speed moving scenario, a channel environment changes rapidly, and there may be a relatively large quantity of resources used for RRM measurement. This can reduce power consumption, costs, and reporting overheads. In other words, for the second-type terminal, a quantity of bits of an indication of the quantity of resources used for RRM is 1. For example, for the second-type terminal, a bit meaning of the indication of the quantity of resources used for RRM may be: a bit 0 represents 64, and a bit 1 represents 96.

For example, for the second-type terminal, a default value of the indication of the quantity of resources used for RRM is 64. For example, the second-type terminal may be an IoT terminal.

For example, for a third-type terminal, a candidate value set of a maximum quantity is {n16, n32}. If the candidate value set is represented in binary, each value may be indicated by using one bit. For example, the third-type terminal may be a CPE terminal. Considering that the third-type terminal does not have mobility, and transmits large-sized data, there may be a relatively medium quantity of resources used for RRM measurement, and measurement is performed once in a period of time. This minimizes power consumption and reduces costs and reporting overheads while obtaining channel information. In other words, for the third-type terminal, a quantity of bits of an indication of the quantity of resources used for RRM is 1. For example, for the third-type terminal, a bit meaning of the indication of the quantity of resources used for RRM may be: a bit 0 represents 16, and a bit 1 represents 32.

For example, for the third-type terminal, a default value of the indication of the quantity of resources used for RRM is 16. For example, the third-type terminal may be a CPE terminal.

For example, for a fourth-type terminal, a candidate value set of a maximum quantity is {n4, n8, n16, n32, n64, n96}. If the candidate value set is represented in binary, each value may be indicated by using three bits. For example, the fourth-type terminal may be an eMBB terminal. In other words, for the fourth-type terminal, a quantity of bits of an indication of the quantity of resources used for RRM is 3. For example, for the fourth-type terminal, a bit meaning of the indication of the quantity of resources used for RRM may be: a bit 000 represents 4, a bit 001 represents 8, a bit 010 represents 16, a bit 011 represents 32, a bit 100 represents 64, a bit 101 represents 96, and so on.

For example, for the fourth-type terminal, a default value of the indication of the quantity of resources used for RRM is 4. For example, the fourth-type terminal may be an eMBB terminal.

Optionally, the terminal and/or the network device may determine, based on the type of the terminal, the candidate value set of the indication of the quantity of resources used for RRM, and determine, based on the candidate value set, the quantity of bits and the bit meaning of the indication of the quantity of resources used for RRM, to determine a value (e.g., a parameter value) of the quantity of resources used for RRM.

Considering communication features of different types of terminals, a candidate value set of an indication of a quantity, of resources used for RRM, corresponding to a type of a terminal is designed. This can reduce reporting overheads, match a plurality of chips, reduce chip costs, enable terminal energy saving as required, and improve spectral efficiency. (4) Quantity, of MIMO Layers for Downlink Transmission, Supported by a Terminal A feature parameter MIMO-LayersDL is used as an example.

Optionally, there is a correspondence between a candidate value set of a supported quantity of MIMO layers for downlink transmission and a type of a terminal. The correspondence may be predefined in a protocol, or may be configured by the network device for the terminal by using signaling. This is not limited in this application. The signaling may be higher layer signaling or physical layer signaling.

For example, for a type-1 terminal, a candidate value set of a quantity of MIMO layers for downlink transmission is {MLA1, MLA2, MLA3, . . . , MLAn}.

For example, for a type-2 terminal, a candidate value set of a quantity of MIMO layers for downlink transmission is {MLB1, MLB2, MLB3, . . . , MLBn}.

For example, for a type-X terminal, a candidate value set of a quantity of MIMO layers for downlink transmission is {MLX1, MML2, MLX3, . . . , MLXn}.

MLA1, MLA2, MLA3, . . . , MLAn, MLB1, MLB2, MLB3, . . . , MLBn, MLX1, MLX2, MLX3, . . . , and MLXn may be one or more of the following: twoLayers, fourLayers, and eightLayers. Maximum quantities of layers corresponding to twoLayers, fourLayers, and eightLayers are respectively 2, 4, and 8, or may be other values.

Optionally, there is a correspondence between a default value of a supported quantity of MIMO layers for downlink transmission and a type of a terminal. The correspondence may be predefined in a protocol, or may be configured by the network device for the terminal by using signaling. This is not limited in this application. The signaling may be higher layer signaling or physical layer signaling.

Optionally, a default value of a parameter value may be the Pt value in the candidate value set.

For the first type to the fourth type: For example, for a first-type terminal, a candidate value set of a quantity of MIMO layers for downlink transmission is {oneLayer, twoLayers}. If the candidate value set is represented in binary, each value may be indicated by using one bit. For example, the first-type terminal may be a URLLC terminal. Considering that the first-type terminal performs low-latency and high-reliability service transmission of small-sized data, data transmission with a relatively small quantity of layers may be used. In other words, for the first-type terminal, a quantity of bits of an indication of the supported quantity of downlink MIMO layers is 1. For example, for the first-type terminal, a bit meaning of the indication of the supported quantity of downlink MIMO layers may be: a bit 0 represents one layer, and a bit 1 represents two layers.

For example, for the first-type terminal, a default value of the indication of the supported quantity of downlink MIMO layers is 1. For example, the first-type terminal may be a URLLC terminal.

For example, for a second-type terminal, a candidate value set of a quantity of MIMO layers for downlink transmission is {oneLayer, twoLayers}. If the candidate value set is represented in binary, each value may be indicated by using one bit. For example, the second-type terminal may be an IoT terminal. Considering that the second-type terminal transmits small-sized data, data transmission with a relatively small quantity of layers may be used. In other words, for the second-type terminal, a quantity of bits of an indication of the supported quantity of downlink MIMO layers is 1. For example, for the second-type terminal, a bit meaning of the indication of the supported quantity of downlink MIMO layers may be: a bit 0 represents one layer, and a bit 1 represents two layers.

For example, for the second-type terminal, a default value of the indication of the supported quantity of downlink MIMO layers is 1. For example, the second-type terminal may be an IoT terminal.

For example, for a third-type terminal, a candidate value set of a quantity of MIMO layers for downlink transmission is {fourLayers, eightLayers}. If the candidate value set is represented in binary, each value may be indicated by using one bit. For example, the third-type terminal may be a CPE terminal. Considering that the third-type terminal is static and transmits large-sized data, data transmission with a relatively large quantity of layers may be used, to implement high-speed transmission and reduce reporting overheads. In other words, for the third-type terminal, a quantity of bits of an indication of the supported quantity of downlink MIMO layers is 1. For example, for the third-type terminal, a bit meaning of the indication of the supported quantity of downlink MIMO layers may be: a bit 0 represents four layers, and a bit 1 represents eight layers.

For example, for the third-type terminal, a default value of the indication of the supported quantity of downlink MIMO layers is 4. For example, the third-type terminal may be a CPE terminal.

For example, for a fourth-type terminal, a candidate value set of a quantity of MIMO layers for downlink transmission is {twoLayers, fourLayers, eightLayers}. If the candidate value set is represented in binary, each value may be indicated by using two bits. For example, the fourth-type terminal may be an eMBB terminal. In other words, for the fourth-type terminal, a quantity of bits of an indication of the supported quantity of downlink MIMO layers is 2. For example, for the fourth-type terminal, a bit meaning of the indication of the supported quantity of downlink MIMO layers may be: a bit 00 represents two layers, a bit 01 represents four layers, a bit 10 represents eight layers, and so on.

For example, for the fourth-type terminal, a default value of the indication of the supported quantity of downlink MIMO layers is 2. For example, the fourth-type terminal may be an eMBB terminal.

Optionally, the terminal and/or the network device may determine, based on the type of the terminal, the candidate value set of the indication of the supported quantity of downlink MIMO layers, and determine, based on the candidate value set, the quantity of bits and the bit meaning of the indication of the supported quantity of downlink MIMO layers, to determine a value (e.g., a parameter value) of the supported quantity of downlink MIMO layers.

Considering communication features of different types of terminals, a candidate value set of the indication of the supported quantity, of downlink MIMO layers, corresponding to a type of a terminal is designed. This can reduce reporting overheads, match a plurality of chips, reduce chip costs, enable terminal energy saving as required, and improve spectral efficiency.

(5) Quantity, of MIMO Layers for Uplink Transmission, Supported by a Terminal

A feature parameter MIMO-LayersUL is used as an example:

Optionally, there is a correspondence between a candidate value set of a supported quantity of MIMO layers for uplink transmission and a type of a terminal. The correspondence may be predefined in a protocol, or may be configured by the network device for the terminal by using signaling. This is not limited in this application. The signaling may be higher layer signaling or physical layer signaling.

For example, for a type-1 terminal, a candidate value set of a quantity of MIMO layers for uplink transmission is {MUA1, MUA2, . . . , MUAn}

For example, for a type-2 terminal, a candidate value set of a quantity of MIMO layers for uplink transmission is {MUB1, MUB2, . . . , MUBn}.

For example, for a type-X terminal, a candidate value set of a quantity of MIMO layers for uplink transmission is {MUX1, MUL2, . . . , MUXn}.

MUA1, MUA2, . . . , MUAn, MUB1, MUB2, . . . , MUBn, MUX1, MUX2, . . . , and MUXn may be one or more of the following: oneLayer, twoLayers, fourLayers, and eightLayers. Maximum quantities of layers corresponding to oneLayer, twoLayers, fourLayers and eightLayers are respectively 1, 2, 4, and 8, or may be other values.

Optionally, there is a correspondence between a default value of a supported quantity of MIMO layers for uplink transmission and a type of a terminal. The correspondence may be predefined in a protocol, or may be configured by the network device for the terminal by using signaling. This is not limited in this application. The signaling may be higher layer signaling or physical layer signaling.

Optionally, a default value of a parameter value may be the $1^{st}$ value in the candidate value set.

For the first type to the fourth type:

For example, for a first-type terminal, a candidate value set of a quantity of MIMO layers for uplink transmission is {oneLayer, twoLayers}. If the candidate value set is represented in binary, each value may be indicated by using one bit. For example, the first-type terminal may be a URLLC terminal. Considering that the first-type terminal performs low-latency and high-reliability service transmission of small-sized data, data transmission with a relatively small quantity of layers may be used. In other words, for the first-type terminal, a quantity of bits of an indication of the supported quantity of uplink MIMO layers is 1. For example, for the first-type terminal, a bit meaning of the indication of the supported quantity of uplink MIMO layers may be: a bit 0 represents one layer, and a bit 1 represents two layers.

For example, for the first-type terminal, a default value of the indication of the supported quantity of uplink MIMO layers is 1. For example, the first-type terminal may be a URLLC terminal.

For example, for a second-type terminal, a candidate value set of a quantity of MIMO layers for uplink transmission is {oneLayer, twoLayers}. If the candidate value set is represented in binary, each value may be indicated by using one bit. For example, the second-type terminal may be an IoT terminal. Considering that the second-type terminal transmits small-sized data, data transmission with a relatively small quantity of layers may be used. In other words, for the second-type terminal, a quantity of bits of an indication of the supported quantity of uplink MIMO layers is 1. For example, for the second-type terminal, a bit meaning of the indication of the supported quantity of uplink MIMO layers may be: a bit 0 represents one layer, and a bit 1 represents two layers.

For example, for the second-type terminal, a default value of the indication of the supported quantity of uplink MIMO layers is 1. For example, the second-type terminal may be an IoT terminal.

For example, for a third-type terminal, a candidate value set of a quantity of MIMO layers for uplink transmission is {fourLayers, eightLayers}. If the candidate value set is represented in binary, each value may be indicated by using one bit. For example, the third-type terminal may be a CPE terminal. Considering that the third-type terminal is static and transmits large-sized data, data transmission with a relatively large quantity of layers may be used, to implement high-speed transmission and reduce reporting overheads. In other words, for the third-type terminal, a quantity of bits of an indication of the supported quantity of uplink MIMO layers is 1. For example, for the third-type terminal, a bit meaning of the indication of the supported quantity of uplink MIMO layers may be: a bit 0 represents four layers, and a bit 1 represents eight layers.

For example, for the third-type terminal, a default value of the indication of the supported quantity of uplink MIMO layers is 4. For example, the third-type terminal may be a CPE terminal.

For example, for a fourth-type terminal, a candidate value set of a quantity of MIMO layers for uplink transmission is {oneLayer, twoLayers, fourLayers, eightLayers}. If the candidate value set is represented in binary, each value may be indicated by using two bits.

For example, the fourth-type terminal may be an eMBB terminal. In other words, for the fourth-type terminal, a quantity of bits of an indication of the supported quantity of uplink MIMO layers is 2. For example, for the fourth-type terminal, a bit meaning of the indication of the supported quantity of uplink MIMO layers may be: a bit 00 represents one layer, a bit 01 represents two layers, a bit 10 represents four layers, a bit 11 represents four layers, and so on.

For example, for the fourth-type terminal, a default value of the indication of the supported quantity of downlink MIMO layers is 1. For example, the fourth-type terminal may be an eMBB terminal.

Optionally, the terminal and/or the network device may determine, based on the type of the terminal, the candidate value set of the indication of the supported quantity of uplink MIMO layers, and determine, based on the candidate value set, the quantity of bits and the bit meaning of the indication of the supported quantity of uplink MIMO layers, to determine a value (e.g., a parameter value) of the supported quantity of uplink MIMO layers.

Beneficial effects are as follows: Considering communication features of different types of terminals, a candidate value set of the indication of the supported quantity, of uplink MIMO layers, corresponding to a type of a terminal is designed. This can reduce reporting overheads, match a plurality of chips, reduce chip costs, enable terminal energy saving as required, and improve spectral efficiency.

(6) Bandwidth Supported by a Terminal

A feature parameter SupportedBandwidth is used as an example.

Optionally, there is a correspondence between a candidate value set of a supported bandwidth and a type of a terminal. The correspondence may be predefined in a protocol, or may be configured by the network device for the terminal by using signaling. This is not limited in this application. The signaling may be higher layer signaling or physical layer signaling.

In an FR1, a candidate value set of a bandwidth is {5 MHz, 10 MHz, 15 MHz, 20 MHz, 25 MHz, 30 MHz, 40 MHz, 50 MHz, 60 MHz, 80 MHz, 100 MHz}. If the candidate value set is represented in binary, each value may be indicated by using four bits.

In an FR2, a candidate value set of a bandwidth is {50 MHz, 100 MHz, 200 MHz, 400 MHz}. If the candidate value set is represented in binary, each value may be indicated by using two bits.

For example, for a type-1 terminal, a candidate value set of a bandwidth is {SBA1, SBA2, . . . , SBAn}.

For example, for a type-2 terminal, a candidate value set of a bandwidth is {SBB1, SBB2, . . . , SBBn}.

For example, for a type-X terminal, a candidate value set of a bandwidth is {SBX1, SBL2, . . . , SBXn}.

SBA1, SBA2, . . . , SBAn, SBB1, SBB2, . . . , SBBn, SBX1, SBX2, . . . , and SBXn may be one or more of the following: mhz5, mhz10, mhz15, mhz20, mhz25, mhz30, mhz40, mhz50, mhz60, mhz80, mhz100, mhz200, and mhz400. mhz5, mhz10, mhz15, mhz20, mhz25, mhz30, mhz40, mhz50, mhz60, mhz80, mhz100, mhz200, and mhz400 respectively correspond to 5 MHz, 10 MHz, 15 MHz, 20 MHz, 25 MHz, 30 MHz, 40 MHz, 50 MHz, 60 MHz, 80 MHz, 100 MHz, 200 MHz, and 400 MHz, or may be other values.

Optionally, there is a correspondence between a default value of a supported bandwidth and a type of a terminal. The correspondence may be predefined in a protocol, or may be configured by the network device for the terminal by using signaling. This is not limited in this application. The signaling may be higher layer signaling or physical layer signaling.

Optionally, a default value of a parameter value may be the Pt value in the candidate value set.

For the first type to the fourth type:

For example, for a first-type terminal, in an FR1, a candidate value set of a bandwidth may be {5 MHz, 10 MHz, 20 MHz, 25 MHz, 40 MHz, 50 MHz, 60 MHz, 80 MHz}. If the candidate value set is represented in binary, each value may be indicated by using three bits. For example, the first-type terminal may be a URLLC terminal. In other words, for the first-type terminal, a quantity of bits of an indication of the supported bandwidth is 3. For example, for the first-type terminal, a bit meaning of the indication of the supported bandwidth may be: a bit 000 represents 5 MHz, a bit 001 represents 10 MHz, and so on.

For example, for the first-type terminal, a default value of the indication of the supported bandwidth is 5 MHz. For example, the first-type terminal may be a URLLC terminal.

The URLLC performs low-latency and high-reliability service transmission of a small packet, so that data transmission with a relatively small bandwidth can be used, to reduce power consumption, costs, and reporting overheads.

For example, for a second-type terminal, in an FR1, a candidate value set of a bandwidth may be {1.8 MHz, 5 MHz, 10 MHz, 20 MHz}. If the candidate value set is represented in binary, each value may be indicated by using two bits. For example, the second-type terminal may be an IoT terminal. In other words, for the second-type terminal, a quantity of bits of an indication of the supported bandwidth is 2. For example, for the second-type terminal, a bit meaning of the indication of the supported bandwidth may be: a bit 00 represents 1.8 MHz, a bit 01 represents 5 MHz, a bit 10 represents 10 MHz, a bit 11 represents 20 MHz, and so on.

For example, for the second-type terminal, a default value of the indication of the supported bandwidth is 1.8 MHz. For example, the second-type terminal may be an IoT terminal.

Considering that the second-type terminal transmits small-sized data, data transmission with a relatively small quantity of layers may be used, to reduce power consumption, costs, and reporting overheads.

For example, for a third-type terminal, in an FR1, a candidate value set of a bandwidth may be {20 MHz, 40 MHz, 60 MHz, 100 MHz}. If the candidate value set is represented in binary, each value may be indicated by using two bits. For example, the third-type terminal may be a CPE terminal. In other words, for the third-type terminal, a quantity of bits of an indication of the supported bandwidth is 2. For example, for the third-type terminal, a bit meaning of the indication of the supported bandwidth may be: a bit 00 represents 20 MHz, a bit 01 represents 40 MHz, a bit 10 represents 60 MHz, a bit 11 represents 100 MHz, and so on.

For example, for the third-type terminal, a default value of the indication of the supported bandwidth is 20 MHz. For example, the third-type terminal may be a CPE terminal.

Considering that the third-type terminal is at a fixed location and transmits large-sized data, data transmission with a relatively large quantity of layers may be used, to implement high-speed transmission and reduce reporting overheads.

For example, for a fourth-type terminal, in an FR1, a candidate value set of a bandwidth is {5 MHz, 10 MHz, 15 MHz, 20 MHz, 25 MHz, 30 MHz, 40 MHz, 50 MHz, 60

MHz, 80 MHz, 100 MHz}. If the candidate value set is represented in binary, each value may be indicated by using four bits. For example, the fourth-type terminal may be an eMBB terminal. In other words, for the fourth-type terminal, a quantity of bits of an indication of the supported bandwidth is 4. For example, for the fourth-type terminal, a bit meaning of the indication of the supported bandwidth may be: a bit 0000 represents 5 MHz, a bit 0001 represents 10 MHz, a bit 0010 represents 15 MHz, a bit 0011 represents 20 MHz, and so on.

For example, for the fourth-type terminal, a default value of the indication of the supported bandwidth is 5 MHz. For example, the fourth-type terminal may be an eMBB terminal.

Optionally, the terminal and/or the network device may determine, based on the type of the terminal, the candidate value set of the indication of the supported bandwidth, and determine, based on the candidate value set, the quantity of bits and the bit meaning of the indication of the supported bandwidth, to determine a value (a parameter value) of the supported bandwidth.

Considering communication features of different types of terminals, a candidate value set of the indication of the supported bandwidth corresponding to a type of a terminal is designed. This can reduce reporting overheads, match a plurality of chips, reduce chip costs, enable terminal energy saving as required, and improve spectral efficiency.

This application provides a method for determining a feature of a terminal, to customize and minimize a feature of a terminal, meet feature requirements of different types of terminals, reduce chip costs and terminal implementation processing complexity, and implement terminal energy saving.

For example, the terminal determines a first set. The first set includes an air interface communication feature. The air interface communication feature includes at least one of the following features: ultra-low latency processing timing, a cyclic prefix-orthogonal frequency division multiplexing CP-OFDM waveform, data transmission based on configured grant, slot aggregation, a quantity 2 of hybrid automatic repeat request HARQ processes, synchronization signal block based radio link management and/or radio resource management, aperiodic channel state information measurement and reporting, beam tracking, and beam management; and/or a positioning feature includes at least one of the following features: a positioning feature based on a downlink angle of departure DL AOD, a positioning feature based on a downlink-time difference of arrival DL-TDOA, a bandwidth size of a positioning reference signal, a quantity of downlink positioning reference signal resources, and support of sending a periodic sounding reference signal SRS used for positioning. For example, the type of the terminal is a first type. For example, the first-type terminal may be a URLLC terminal.

For example, the terminal determines a first set. The first set further includes an air interface communication feature. The air interface communication feature includes at least one of the following features: a low-cost waveform, data channel repetition, data transmission based on configured grant, slot aggregation, and a quantity 1 of HARQ processes. For example, the type of the terminal is a second type. For example, the second-type terminal is an IoT terminal.

In this application, a terminal and/or a network device may determine a candidate value set of a feature based on a type of the terminal, and determine a value of the feature based on the candidate value set of the feature. The value of the feature may include a quantity of bits and a bit meaning of the value.

It should be noted that the foregoing uses only the parameters (1) to (5) as an example, and the solutions in embodiments of this application may be further applied to another parameter. For example, feature parameters of a terminal in the protocol 38.331 may alternatively be used. For example, the feature parameters are a carrier aggregation parameter, a frequency band parameter, a MIMO parameter, a downlink feature set, an uplink feature set, a physical layer parameter, an RLC parameter, an RRC parameter, a MAC parameter, a service data adaptation protocol (SDAP) parameter, a sidelink parameter, a self-organized networked (SON) parameter, an unlicensed parameter, a positioning parameter, a sensing parameter, an AI parameter, a radio frequency (RF) parameter, an energy saving parameter, a new radio dual connectivity (NRDC) parameter, a measurement mobility parameter, an inter-radio access technology (inter-RAT) communication parameter, and a high-speed parameter.

In the conventional technology, a default value and/or a candidate value set of a feature are/is defined only for eMBB. When the default value and/or the candidate value are/is applicable to a plurality of different terminals, values of some features may not be applicable to terminals of other terminal types, resulting in high reporting overheads. However, in this application, a default value or a candidate value set of a feature may be separately defined for different types of terminals. This meets feature requirements of different types of terminals, reduces chip costs and signaling overheads, and implements terminal energy saving.

It may be understood that, to implement the functions in the foregoing embodiments, the network device and the terminal include corresponding hardware structures and/or software modules for performing each function. A person skilled in the art should be easily aware that, in combination with the units and the method steps in the examples described in embodiments disclosed in this application, this application can be implemented through hardware or a combination of hardware and computer software. Whether a function is performed through hardware or hardware driven by computer software depends on particular application scenarios and implementation constraint conditions of the technical solutions.

Figure 6:
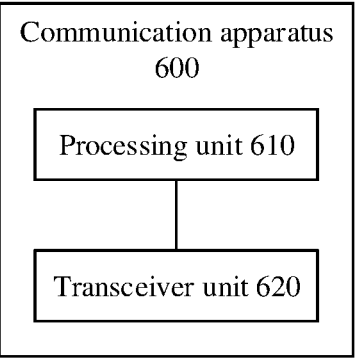
FIG. 6 is an example schematic diagram of a structure of a possible communication apparatus according to an embodiment of this application.
Figure 7:
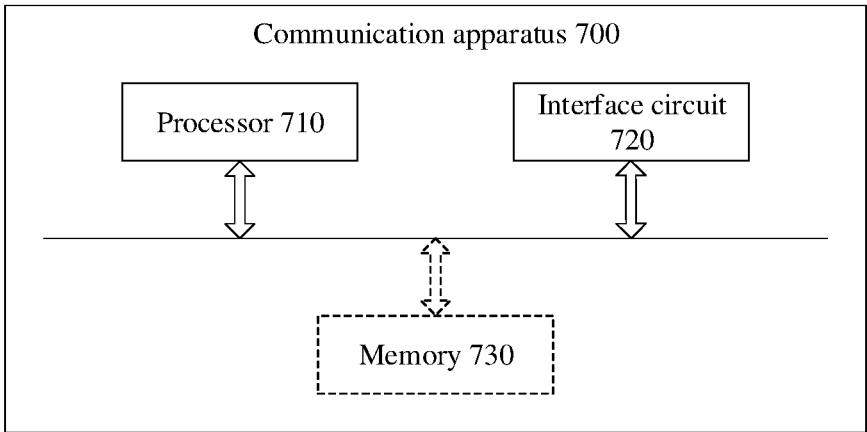
FIG. 7 is an example schematic diagram of another structure of a possible communication apparatus according to an embodiment of this application.

FIG. 6 and FIG. 7 are schematic diagrams of structures of possible communication apparatuses according to embodiments of this application. The communication apparatus may be configured to implement a function of the terminal of the network device in the foregoing method embodiments. Therefore, beneficial effects of the foregoing method embodiments can also be implemented. In this embodiment of this application, the communication apparatus may be the terminals 120a to 120j shown in FIG. 1, or may be the base station devices 110a and 110b shown in FIG. 1, or may be a module (for example, a chip) used in the terminal or the network device.

As shown in FIG. 6, a communication apparatus 600 includes a processing unit 610 and a transceiver unit 620. The communication apparatus 600 is configured to implement a function of the terminal or the network device in the method embodiment shown in FIG. 2, FIG. 3, or FIG. 4.

When the communication apparatus 600 is configured to implement a function of the terminal in the method embodiment shown in FIG. 2, the processing unit 610 is configured to determine a feature set of the terminal; and the transceiver unit 620 is configured to communicate with a network device based on a feature in the feature set of the terminal.

Optionally, the transceiver unit 620 is further configured to receive first indication information sent by the network device.

Optionally, the transceiver unit 620 is further configured to send first acknowledgment information to the network device.

Optionally, the transceiver unit 620 is further configured to send second indication information to the network device.

Optionally, the transceiver unit 620 is further configured to receive second acknowledgment information sent by the network device.

When the communication apparatus 600 is configured to implement a function of the network device in the method embodiment shown in FIG. 2, the processing unit 610 is configured to determine a feature set of a terminal based on a type of the terminal; and the transceiver unit 620 is configured to communicate with the terminal based on a feature in the feature set of the terminal.

Optionally, the transceiver unit 620 is further configured to send first indication information to the terminal.

Optionally, the transceiver unit 620 is further configured to receive first acknowledgment information sent by the terminal.

Optionally, the transceiver unit 620 is further configured to receive second indication information sent by the terminal.

Optionally, the transceiver unit 620 is further configured to send second acknowledgment information to the terminal.

When the communication apparatus 600 is configured to implement a function of the terminal in the method embodiment shown in FIG. 3, the transceiver unit 620 is configured to receive first indication information sent by a network device; and the processing unit 610 is configured to determine a feature set of the terminal based on the first indication information.

The transceiver unit 620 is further configured to communicate with the network device based on a feature in the feature set of the terminal.

Optionally, the transceiver unit 620 is further configured to send first acknowledgment information to the network device.

When the communication apparatus 600 is configured to implement a function of the network device in the method embodiment shown in FIG. 3, the processing unit 610 is configured to determine a feature set of a terminal based on a type of the terminal; and the transceiver unit 620 is configured to: send first indication information to the terminal; and communicate with the terminal based on a feature in the feature set of the terminal.

Optionally, the transceiver unit 620 is further configured to receive first acknowledgment information sent by the terminal.

When the communication apparatus 600 is configured to implement a function of the terminal in the method embodiment shown in FIG. 4, the processing unit 610 is configured to determine a feature set of the terminal; and the transceiver unit 620 is configured to: send second indication information to a network device; and communicate with the network device based on a feature in the feature set of the terminal.

Optionally, the transceiver unit 620 is further configured to receive second acknowledgment information sent by the network device.

When the communication apparatus 600 is configured to implement a function of the network device in the method embodiment shown in FIG. 4, the transceiver unit 620 is configured to receive second indication information sent by a terminal; and the processing unit 610 is configured to determine a feature set of the terminal based on the second indication information.

The transceiver unit 620 is configured to communicate with the terminal based on a feature in the feature set of the terminal.

Optionally, the transceiver unit 620 is further configured to send second acknowledgment information to the terminal.

For more detailed descriptions of the processing unit 610 and the transceiver unit 620, directly refer to related descriptions in the method embodiments shown in FIG. 2 to FIG. 4.

As shown in FIG. 7, a communication apparatus 700 includes a processor 710 and an interface circuit 720. The processor 710 and the interface circuit 720 are coupled to each other. It may be understood that the interface circuit 720 may be a transceiver or an input/output interface. Optionally, the communication apparatus 700 may further include a memory 730, configured to store instructions executed by the processor 710, or store input data required by the processor 710 to run instructions, or store data generated after the processor 710 runs instructions.

When the communication apparatus 700 is configured to implement the methods shown in FIG. 2 to FIG. 4, the processor 710 is configured to implement a function of the processing unit 610, and the interface circuit 720 is configured to implement a function of the transceiver unit 620.

When the communication apparatus is a chip used in a terminal device, the chip in the terminal device implements a function of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip used in a network device, the chip in the network device implements a function of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general purpose processor may be a microprocessor, or may be any conventional processor or the like.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory, a programmable read-only memory, an erasable programmable read-only memory, an electrically erasable programmable read-only memory, a register, a hard disk, a removable hard disk, a CD-ROM, or a storage medium of any other form well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may exist in the network device or the terminal device as discrete components.

All or some of the foregoing embodiments may be implemented by using software, hardware, firmware, or any combination thereof. When software is used to implement embodiments, all or some of embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired manner or in a wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; or may be an optical medium, for example, a digital video disc (DVD); or may be a semiconductor medium, for example, a solid-state disk.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship between associated objects, and indicates that at least three relationships may exist. For example, A and/or B may indicate the following three cases: only A exists, both A and B exist, and only B exists, where A and B may be singular or plural. In text descriptions of this application, the character "/" usually indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

What is claimed is:

1. An apparatus, comprising:
a processor; and
a memory configured to store computer readable instructions that, when executed by the processor, cause the apparatus to:
determine a feature set of a terminal, wherein
the feature set includes a first set and a second set,
the first set includes a minimum feature set of the terminal,
the first set is related to a type of the terminal,
the first set is a non-empty set,
the second set includes a feature belonging to an optional feature set,
the feature set includes a first feature having at least a default value, and
the default value of the first feature is related to the type of the terminal,
a plurality of features are associated with the type of the terminal,
the plurality of features include a data transmission size, a mobility type, a latency and reliability requirement, an uplink and downlink requirement, and a channel environment; and
communicate with a network device based on at least the first feature included in the feature set.

2. The apparatus according to claim 1, wherein
the feature set includes a second feature, and
the apparatus is further caused to:
receive first indication information from the network device, wherein
the first indication information indicates enabling or disabling of the second feature, or indicates a value of the second feature.

3. The apparatus according to claim 1, wherein
the feature set includes a third feature, and
the apparatus is further caused to:
send second indication information to the network device, wherein
the second indication information indicates enabling or disabling of the third feature, or indicates a value of the third feature.

4. The apparatus according to claim 1, wherein
a plurality of different terminals include types having attributes including any of: a supported service type, a mobility requirement, a service data transmission latency requirement, a radio channel environment, a service data transmission reliability requirement, a coverage requirement, and a deployment scenario, or
the type of the terminal is at least one of: an enhanced mobile broadband (eMBB) terminal, an ultra-reliable low-latency communication (URLLC) terminal, an internet of things (IoT) terminal, customer premise equipment (CPE), an augmented reality (AR) terminal, a virtual reality (VR) terminal, a machine type communication (MTC) terminal, and a vehicle to everything (V2X) terminal.

5. The apparatus according to claim 4, wherein the first set includes a positioning feature and a sidelink communication feature, in association with the type of the terminal being a first type;

the first set includes a sensing feature and a non-terrestrial network (NTN) communication feature, in association with the type of the terminal being a second type; and/or the first set includes an artificial intelligence (AI) feature, in association with the type of the terminal being a third type.

6. The apparatus according to claim 5, wherein the first set further comprises an air interface communication feature, in association with the type of the terminal being the first type, wherein the air interface communication feature includes at least one of: ultra-low latency processing timing, a cyclic prefix-orthogonal frequency division multiplexing (CP-OFDM) waveform, data transmission based on configured grant, slot aggregation, a quantity 2 of hybrid automatic repeat request (HARQ) processes, synchronization signal block based radio link management and/or radio resource management, aperiodic channel state information measurement and reporting, beam tracking, and beam management; and/or the positioning feature includes at least one of: a positioning feature based on a downlink angle of departure (DL AOD), a positioning feature based on a downlink-time difference of arrival (DL-TDOA), a bandwidth size of a positioning reference signal, a quantity of downlink positioning reference signal resources, and support of sending a periodic sounding reference signal (SRS) used for positioning; and/or the first set further includes an air interface communication feature, in association with the type of the terminal being the second type, wherein the air interface communication feature includes at least one of: a low-cost waveform, data channel repetition, data transmission based on configured grant, slot aggregation, and a quantity 1 of HARQ processes.

7. A method for determining a feature of a terminal, the method comprising:

determining a feature set of a terminal based on a type of the terminal, wherein the feature set includes a first set and a second set, the first set includes a minimum feature set of the terminal, the first set is a non-empty set, the second set includes a feature belonging to an optional feature set, the feature set includes a first feature having at least a default value, the default value of the first feature is related to the type of the terminal, a plurality of features are associated with the type of the terminal, and the plurality of features include a data transmission size, a mobility type, a latency and reliability requirement, an uplink and downlink requirement, and a channel environment; and communicating with the terminal based on at least the first feature included in the feature set.

8. The method according to claim 7, wherein the feature set includes a second feature, and the method further comprises:

sending first indication information to the terminal, wherein the first indication information indicates enabling or disabling of the second feature, or indicates a value of the second feature.

9. The method according to claim 7, wherein the feature set includes a third feature, and the method further comprises:

receiving second indication information from the terminal, wherein the second indication information indicates enabling or disabling of the third feature, or indicates a value of the third feature.

10. The method according to claim 7, wherein a plurality of different terminals include types having attributes including any of: a supported service type, a mobility requirement, a service data transmission latency requirement, a radio channel environment, a service data transmission reliability requirement, a coverage requirement, and a deployment scenario, or the type of the terminal is one of the following: an enhanced mobile broadband (eMBB) terminal, an ultra-reliable low-latency communication (URLLC) terminal, an internet of things (IoT) terminal, customer premise equipment (CPE), an augmented reality (AR) terminal, a virtual reality (VR) terminal, a machine type communication (MTC) terminal, and a vehicle to everything (V2X) terminal.

11. The method according to claim 10, wherein the first set comprises a positioning feature and a sidelink communication feature, in association with the type of the terminal being a first type;

the first set comprises a sensing feature and a non-terrestrial network (NTN) communication feature, in association with the type of the terminal being a second type; and/or the first set comprises an artificial intelligence (AI) feature, in association with the type of the terminal being a third type.

12. The method according to claim 11, wherein the first set further includes an air interface communication feature, in association with the type of the terminal being the first type, wherein the air interface communication feature includes at least one of: ultra-low latency processing timing, a cyclic prefix-orthogonal frequency division multiplexing (CP-OFDM) waveform, data transmission based on configured grant, slot aggregation, a quantity 2 of hybrid automatic repeat request (HARQ) processes, synchronization signal block based radio link management and/or radio resource management, aperiodic channel state information measurement and reporting, beam tracking, and beam management; and/or the positioning feature includes at least one of: a positioning feature based on a downlink angle of departure (DL AOD), a positioning feature based on a downlink time difference of arrival (DL-TDOA), a bandwidth size of a positioning reference signal, a quantity of downlink positioning reference signal resources, and support of sending a periodic sounding reference signal (SRS) used for positioning; and/or the first set further includes an air interface communication feature, in association with the type of the terminal being the second type, wherein the air interface communication feature includes at least one of: a low-cost waveform, data channel repetition, data transmission based on configured grant, slot aggregation, and a quantity 1 of HARQ processes.

13. An apparatus, comprising:

a processor; and a memory configured to store computer readable instructions that, when executed by the processor, cause the apparatus to:

determine a feature set of a terminal based on a type of the terminal, wherein the feature set includes a first set and a second set, the first set includes a minimum feature set of the terminal, the first set is a non-empty set, the second set includes a feature belonging to an optional feature set, the feature set includes a first feature having at least a default value, the default value of the first feature is related to the type of the terminal, a plurality of features are associated with the type of the terminal, and the plurality of features include a data transmission size, a mobility type, a latency and reliability requirement, an uplink and downlink requirement, and a channel environment; and communicate with the terminal based on at least the first feature included in the feature set.

14. The apparatus according to claim 13, wherein the feature set includes a second feature, and the apparatus is further caused to:

send first indication information to the terminal, wherein the first indication information indicates enabling or disabling of the second feature, or indicates a value of the second feature.

15. The apparatus according to claim 13, wherein the feature set includes a third feature, and the apparatus is further caused to:

receive second indication information from the terminal, wherein the second indication information indicates enabling or disabling of the third feature, or indicates a value of the third feature.

16. The apparatus according to claim 13, wherein a plurality of different terminals include types having attributes including any of: a supported service type, a mobility requirement, a service data transmission latency requirement, a radio channel environment, a service data transmission reliability requirement, a coverage requirement, and a deployment scenario, or the type of the terminal is one of the following: an enhanced mobile broadband (eMBB) terminal, an ultra-reliable low-latency communication (URLLC) terminal, an internet of things (IoT) terminal, customer premise equipment (CPE), an augmented reality (AR) terminal, a virtual reality (VR) terminal, a machine type communication (MTC) terminal, and a vehicle to everything (V2X) terminal.

17. The apparatus according to claim 16, wherein the first set comprises a positioning feature and a sidelink communication feature, in association with the type of the terminal being a first type;

the first set comprises a sensing feature and a non-terrestrial network (NTN) communication feature, in association with the type of the terminal being a second type; and/or the first set comprises an artificial intelligence (AI) feature, in association with the type of the terminal being a first type.

* * * * *